US007053151B2

(12) United States Patent
Wang et al.

(10) Patent No.: US 7,053,151 B2
(45) Date of Patent: *May 30, 2006

(54) GRAFTED BIODEGRADABLE POLYMER BLEND COMPOSITIONS

(75) Inventors: James H. Wang, Appleton, WI (US); David M. Schertz, Roswell, GA (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 603 days.

This patent is subject to a terminal disclaimer.

(21) Appl. No.: 09/753,076

(22) Filed: Dec. 29, 2000

(65) Prior Publication Data
US 2003/0018128 A1 Jan. 23, 2003

(51) Int. Cl.
*C08F 283/00* (2006.01)
(52) U.S. Cl. ........................................ 525/63
(58) Field of Classification Search ............... 525/63, 525/71
See application file for complete search history.

(56) References Cited

U.S. PATENT DOCUMENTS

| | | | |
|---|---|---|---|
| 3,531,561 A | 9/1970 | Trebu | |
| 3,792,011 A | 2/1974 | Smith et al. | |
| 3,884,994 A | 5/1975 | Critchfield et al. | |
| 4,229,334 A | 10/1980 | Klabacka et al. | |
| 4,284,671 A | 8/1981 | Cancio et al. | |
| 4,367,070 A | 1/1983 | Hayashi et al. | |
| 4,620,999 A | 11/1986 | Holmes | |
| 4,710,187 A | 12/1987 | Boland et al. | |
| 4,762,521 A | 8/1988 | Roessler | |
| 4,770,656 A | 9/1988 | Proxmire et al. | |
| 4,789,592 A | 12/1988 | Taniguchi et al. | |
| 4,798,603 A | 1/1989 | Meyer et al. | |
| 4,826,493 A | 5/1989 | Martini et al. | |
| 4,891,404 A | 1/1990 | Narayan et al. | |
| 4,933,182 A | 6/1990 | Higashi et al. | |
| 5,057,368 A | 10/1991 | Largman et al. | |
| 5,069,970 A | 12/1991 | Largman et al. | |
| 5,108,820 A | 4/1992 | Kaneko et al. | |
| 5,147,712 A | 9/1992 | Miyahara et al. | |
| 5,162,153 A | 11/1992 | Cooke et al. | |
| 5,202,178 A | 4/1993 | Turner | |
| 5,241,066 A | 8/1993 | Davis et al. | |
| 5,273,596 A | 12/1993 | Newkirk | |
| 5,277,976 A | 1/1994 | Hogle et al. | |
| 5,336,552 A | 8/1994 | Strack et al. | |
| 5,342,659 A | 8/1994 | Horowitz et al. | |
| 5,382,400 A | 1/1995 | Pike et al. | |
| 5,420,211 A * | 5/1995 | Hughes et al. ............ 525/404 |
| 5,422,387 A | 6/1995 | Toms et al. | |
| 5,472,518 A | 12/1995 | Patnode et al. | |
| 5,508,101 A | 4/1996 | Patnode et al. | |
| 5,508,378 A | 4/1996 | Ohara et al. | |
| 5,525,671 A | 6/1996 | Ebato et al. | |
| 5,567,510 A | 10/1996 | Patnode et al. | |
| 5,583,187 A | 12/1996 | Sharak et al. | |
| 5,593,778 A | 1/1997 | Kondo et al. | |
| 5,637,631 A | 6/1997 | Kitada et al. | |
| 5,658,977 A | 8/1997 | Yang et al. | |
| 5,685,757 A | 11/1997 | Kirsch et al. | |
| 5,691,424 A | 11/1997 | Suzuki et al. | |
| 5,700,872 A | 12/1997 | Wang et al. | |
| 5,783,504 A | 7/1998 | Ehret et al. | |
| 5,945,480 A * | 8/1999 | Wang et al. ............ 525/58 |
| 5,952,433 A | 9/1999 | Schertz et al. | |
| 6,403,706 B1 * | 6/2002 | Wang et al. ............ 525/61 |
| 6,552,124 B1 * | 4/2003 | Wang et al. ............ 525/63 |
| 6,890,989 B1 * | 5/2005 | Wang et al. ............ 525/54.3 |

FOREIGN PATENT DOCUMENTS

| | | |
|---|---|---|
| EP | 0080274 | 6/1983 |
| EP | 0210754 | 2/1987 |
| EP | 241178 | 10/1987 |
| EP | 0429307 A | 5/1991 |
| EP | 0436966 | 7/1991 |
| EP | 0438598 | 7/1991 |
| EP | 0569153 | 11/1993 |
| EP | 0612773 | 8/1994 |
| EP | 0654504 | 4/1995 |
| EP | 0705934 | 4/1996 |
| FR | 2123419 A | 9/1972 |
| JP | 61-181859 | 8/1986 |
| JP | 6-142127 | 5/1994 |

(Continued)

OTHER PUBLICATIONS

Han, S.L. et al., "Graft Polymerization of Acrylamide onto Poly(Hydroxybutyrate-co-Hydro Xy-Valerate) Films," Polymer, vol. 38 (17) (Aug. 1, 1997), pp. 4505-4511.

Jin, S. et al., "Synthesis and Characterization of Functionalized Poly(Epilon-Caprolactone) Copolymers by Free-Radical Polymerization," Macromolecules, vol. 31 (4) (Feb. 24, 1998), pp. 1010-1015.

Author:Ikejima, T., et al. Title: Infrared Analysis on Blends of Poly (3-Hydrooxybutyric Acid) and Stereoregular Poly (Vinyl Alcohol): Influence of Tecticity of Poly (Vinyl Alcohol) on Crystallization of Poly (3-Hydroxybutyric Acid) Publ.:*Macromolecular Chemistry and Physics* vol. 197(3) pp.: 869-880 Date: Mar. 1, 1996.

(Continued)

*Primary Examiner*—Jeffrey Mullis
(74) *Attorney, Agent, or Firm*—Brinks Hofer Gilson & Lione; G. Peter Nichols

(57) ABSTRACT

The present invention is a hydrolytically modified, biodegradable polymer and a method of making a hydrolytically modifiable a biodegradable polymer. In a preferred embodiment, the invention is a method of grafting polar groups onto biodegradable polymers and modified biodegradable polymer compositions produced by the method. The polymer compositions are useful as components in flushable and degradable articles. Water-sensitive polymer blends and method of making those polymer blends are also disclosed.

25 Claims, 18 Drawing Sheets

FOREIGN PATENT DOCUMENTS

| | | |
|---|---|---|
| JP | 6-207320 | 7/1994 |
| JP | 6-207323 | 7/1994 |
| JP | 6-207324 | 7/1994 |
| JP | 6-248552 | 9/1994 |
| JP | 7-133511 | 5/1995 |
| JP | 8-134723 | 5/1996 |
| WO | WO 92/04412 | 3/1992 |
| WO | WO 94/10257 | 5/1994 |
| WO | WO 94/17226 | 8/1994 |
| WO | WO 95/10645 | 4/1995 |
| WO | WO 96/20738 | 7/1996 |
| WO | WO 97/47670 A | 12/1997 |
| WO | WO 99/06456 A | 2/1999 |

OTHER PUBLICATIONS

Williams et al. Title: Biodegradable Plastics from Plants *Chemtech* pp.: 38-44 Sep. 1, 1996.
Derwent Publications Ltd., Database WPI, JP 08 212995 (Misubishi Paper Mills Ltd.), Aug. 20, 1996.
Derwent Publications Ltd., Database WPI, JP 01 246411 (Sawashita A), Oct. 2, 1989.
ASTM Designation: D 1238-95, "Standard Test Method for Flow Rates of Thermoplastics by Extrusion Plastometer," pp. 273-281 Jan. 1, 1996.
Good, Robert J., et al. *Surface and Colloid Science-Experimental Methods* vol.: II pp.: 31-91 Jan. 1, 1979.
Database WPI Derwent Publications Ltd., Database WPI, EP 640474, (H. Utz), "Laminated Film Manufactured By Vacuum Deposition of Functional Layer Between Two Films".
Database WPI Derwent Publications Ltd., Database WPI, JP 6-212511 A, (Unitika Ltd.), "Biodegradable Staple Fiber Useful for Sanitary Napkin".
Database WPI Derwent Publications Ltd., Database WPI, JP 9-041220 A, (Unitika Ltd.), "Biodegradable Polyester Fiber".
Dreizenshtok G.S. et al. Chemical Abstracts 99(8)54963d, "Cellulose Decomposition in the Sintering of Fibers from Poly(tetrafluoroethylen) Dispersions" *Khim. Volokna* vol.: 3 pp.: 33-34 Jan. 1, 1983.
Fedorova, R.G. et al. Chemical Abstracts 109(4)24162z, "Composite Fibers From Polyacrylonitrile-Aromatic Polyamic Acid Blends" *Khim. Volokna* vol.: 2 pp.: 11-12 Jan. 1, 1998.
Fedorova, R.G. et al. Chemical Abstracts 188(16)106639x, "Structural Thermal Stabilization of Fibers Based on Aromatic and Heterocyclic Polymer Blends" *Prepr.—Mezhdunar. Simp.Khim. Voloknam 2nd* vol.: 4 pp.: 36-45 Jan. 1, 1977.
Geleji, Frigyes et al. Chemical Abstracts 82(14)87465v, "Biocomponent Fiber Structures on Polypropylene Basis" *J. Polym. Sci., Polym. Symp.* vol.: 42 pp.: 713-716 Jan. 1, 1973.
Gusev, V.K. et al. Chemical Abstracts 96(10)70305j, "Two-Component Acetate Threads" *Khim. Volokna* vol.: 6 pp.: 31-32 Jan. 1, 1981.
Sagatova, M. Sh. et al. Chemical Abstracts 102(10)80131f, "Structural and Mechanical Properties of Fibers Produced From Mixtures of Polyacrylonitrile and Chlorinated Poly-(vinyl chloride)" Jan. 1, 1984.
Slizite, G. et al. Chemical Abstracts 105(26)228372v, "Study of Photochemical Degradation of Articles Produced from Complex Triacetate-Polyamide Fiber" *Nauch. Tr. Vuzov LitSSR, Khimiya i Khim. Teknol.* vol.:27 pp.: 98-102 Jan. 1, 1986.
U. Ju Jui et al. Chemical Abstracts 106(12)86124k, "Use of a Reactively Dyed Low-Molecular-Weight Polycaproamide for Production of Colored Polypropylene Fibers" *Khim. Volokna* vol.: 6 pp.: 22-24 Jan. 1, 1986.
Zakirov, I.Z. Chemical Abstracts 96(4)21192M, "Effect of Small Amounts of Polymeric Additives on Structural-Mechanical and Thermal Properties of Synthetic Fibers Spun By a Wet Method" *3-i Mezhdunar. Simpoz. po Khim. Voloknam, Kalinin,* 1981, vol.: 5 pp.: 105-110 Jan. 1, 1981.
Zakirov, I.Z. Chemical Abstracts 102(22)186548n, "Temperature Transitions in Polyacrylonitrile-Fibroin Mixtures" *Vysokomol. Soedin., Ser. B* vol.: 27 pp.: 116-120 Jan. 1, 1985.
Zhao Delu, Xue Du et al. Chemical Abstracts 105(12)99049u, "Applications of Controlled Degradation in Polypropylene Tape Yarns" *Suliao* vol.: 15 pp.: 5-10 Jan. 1, 1986.
Chemical Abstracts 114(22)209209s: abstract of laid open Japanese patent application JP 3040865.
Chemical Abstracts 119(12)119421d: abstract of laid open Japanese patent application JP 5093316.
Chemical Abstracts 119(12)119422e: abstract of laid open Japanese patent application JP 5093318.
Chemical Abstracts 119(24)252062d: abstract of laid open Japanese patent application JP 5163616.
Chemical Abstracts 120(8)79336s: abstract of laid open Japanese patent application JP 5093317.
Chemical Abstracts 122(2)12043s: abstract of laid open Japanese patent application JP 6212548.
Chemical Abstracts 122(2)12091f: abstract of laid open Japanese patent application JP 6248515.
Whittington, Lloyd R. Whittington's Dictionary of Plastics pp.: 258 Jan. 1, 1968.
Sperling, L.H. Graft Copolymers *Introduction to Physical Polymer Science, Chapter 2, Section 2.7.2* pp.: 44-47 Jan. 1, 1986.
U.S. Appl. No. 09/753,075, filed Dec. 29, 2000.
U.S. Appl. No. 09/752,810, filed Dec. 29, 2000.
U.S. Appl. No. 09/753,223, filed Dec. 29, 2000.
U.S. Appl. No. 09/753,077, filed Dec. 29, 2000.

\* cited by examiner

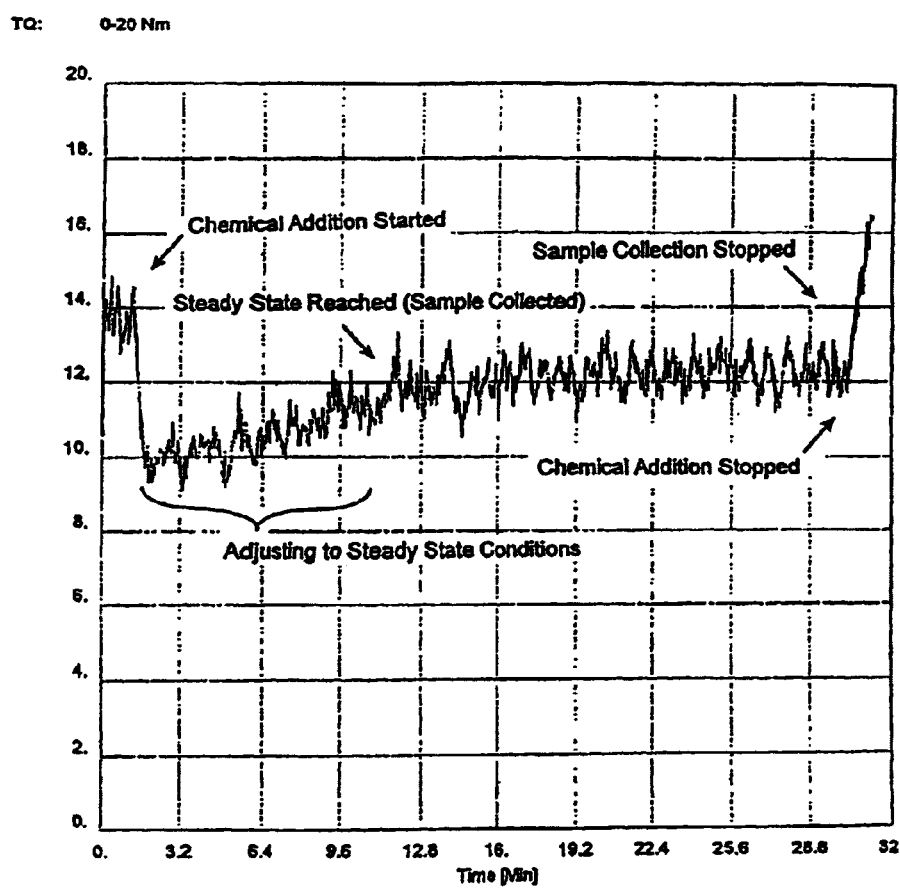
Figure 1. Torque vs. Time Chart for Reactive Extrusion of PHBV with HEMA

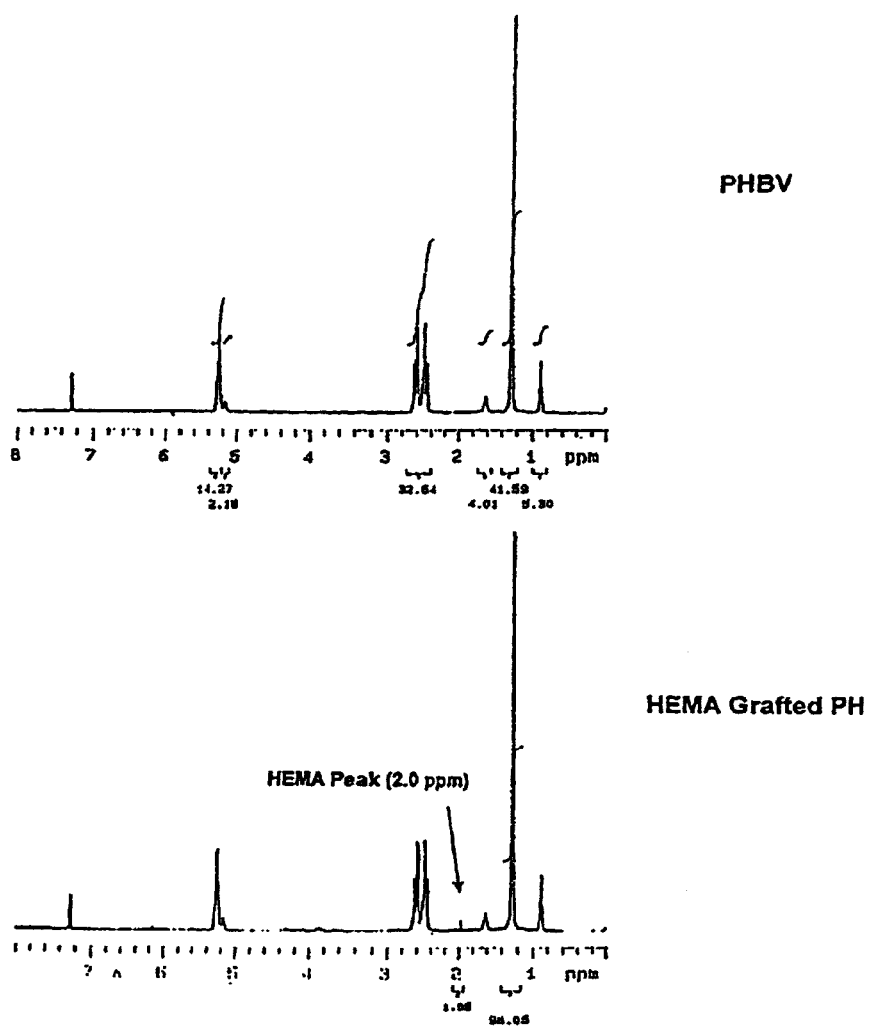

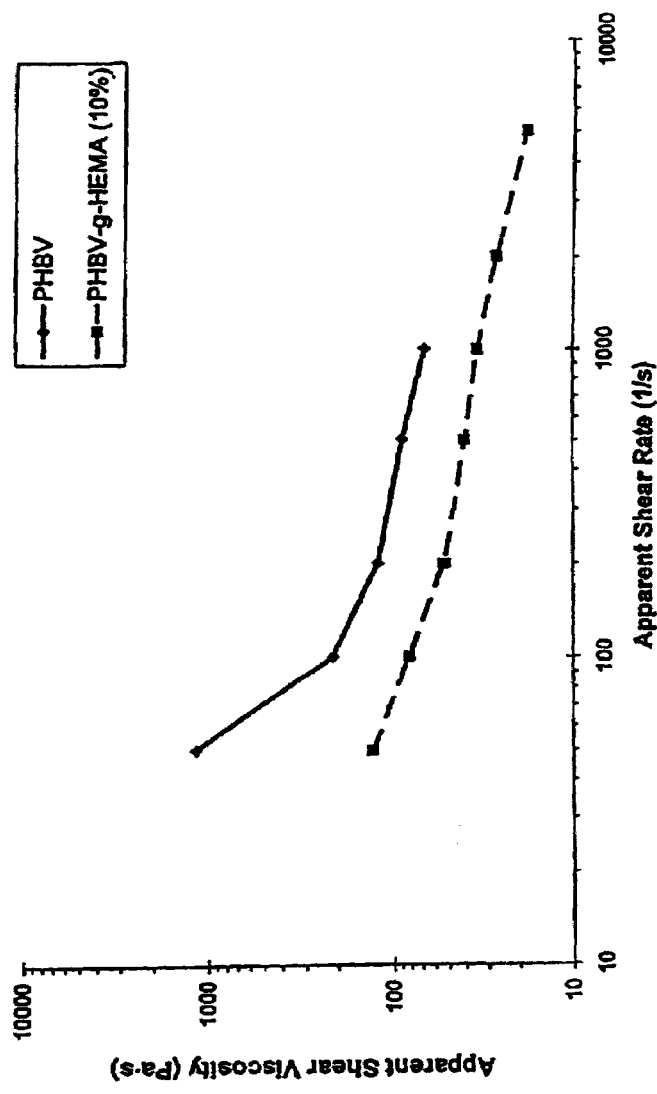
Figure. 3. Melt Rheology at 180°C for PHBV and HEMA Grafted PHBV

Figure 4. DSC Thermogram for PHBV and HEMA Grafted PHBV
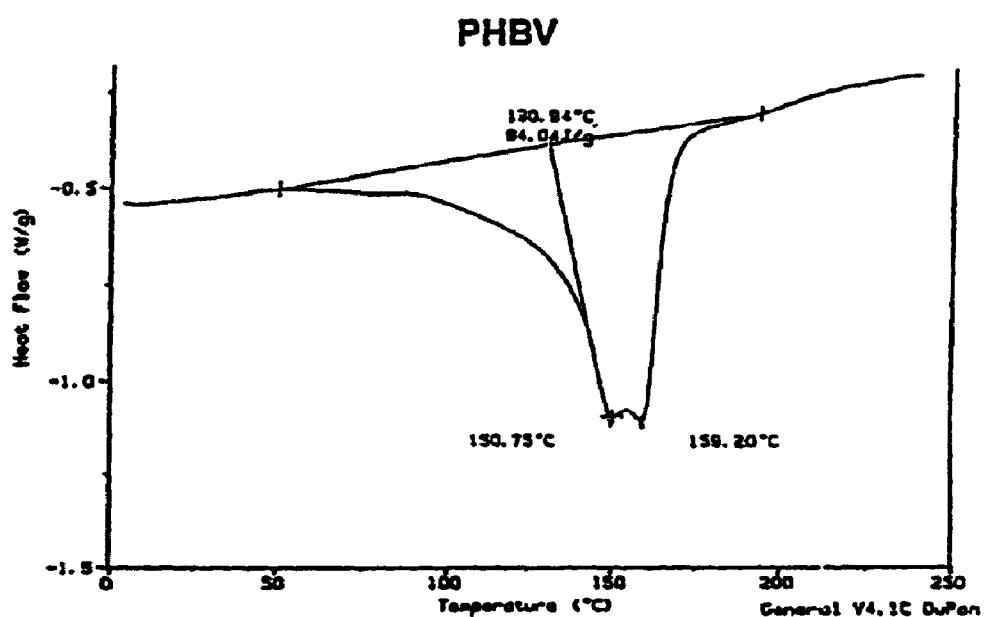
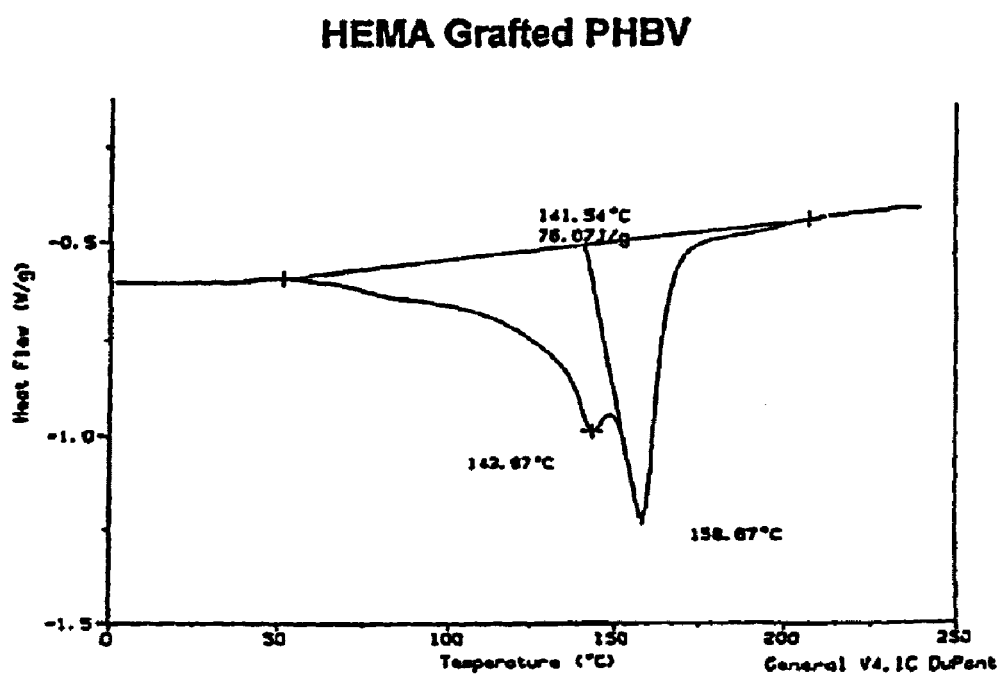

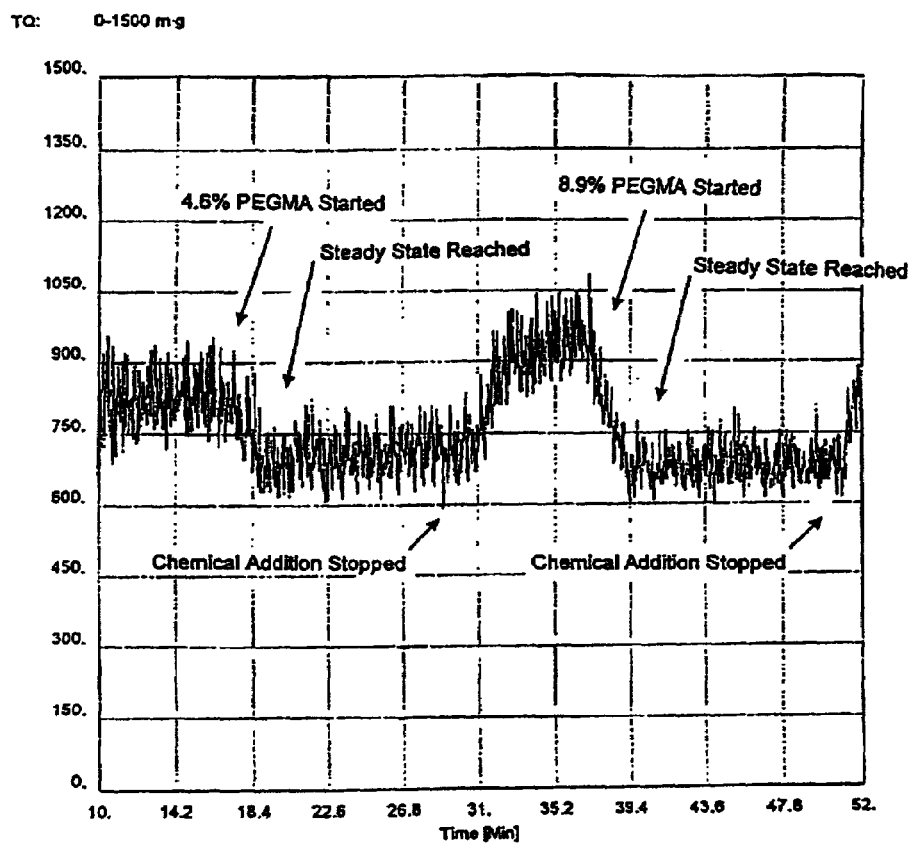
Figure 5. Torque vs. Time Chart for Reactive Extrusion of PBS 1040 with PEGMA on the Haake Extruder

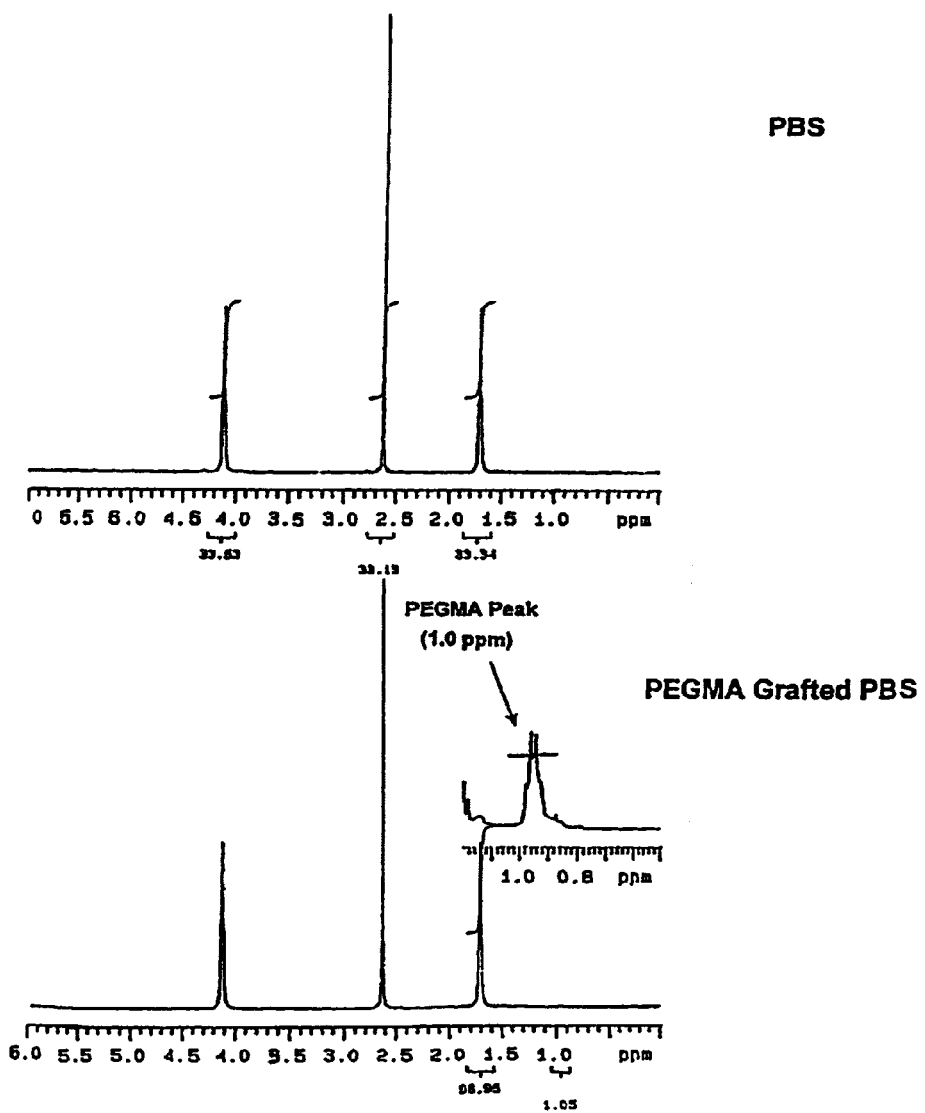
Figure 6. Proton NMR Spectra for PBS and PEGMA Grafted PBS 1040

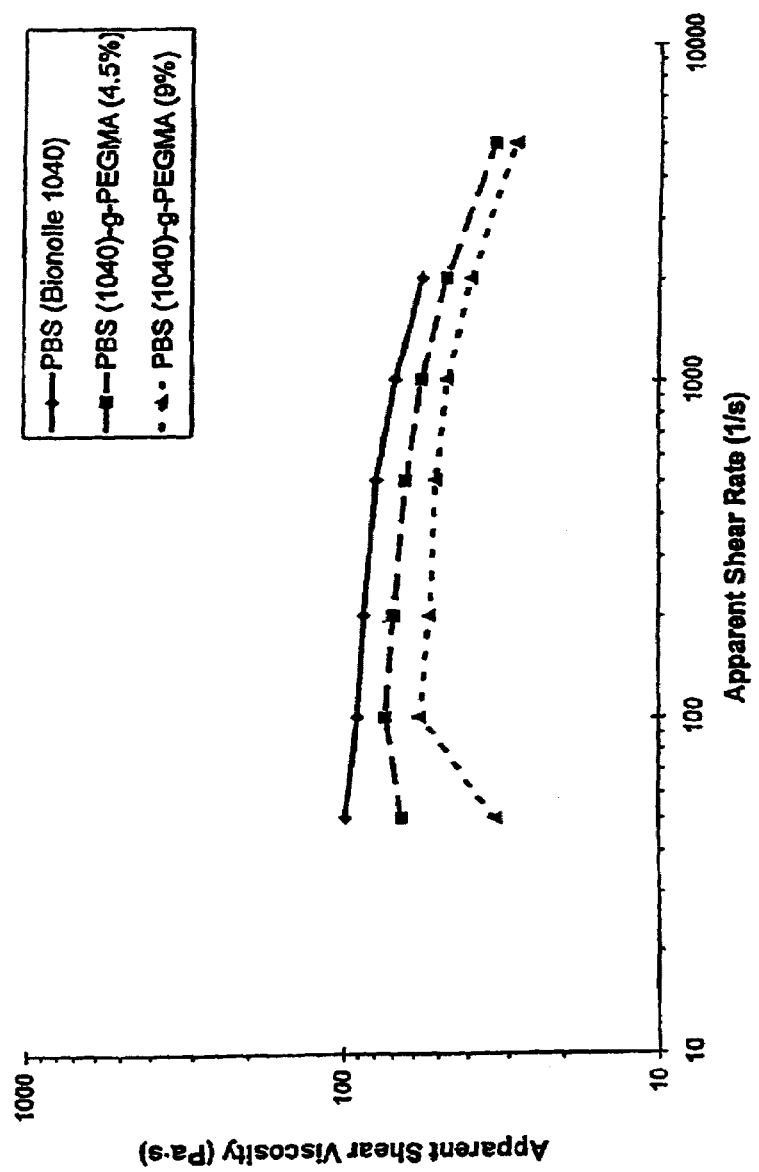
Figure 7. Melt Rheology at 180°C for PBS and PEGMA Grafted PBS (Bionolle® 1040)

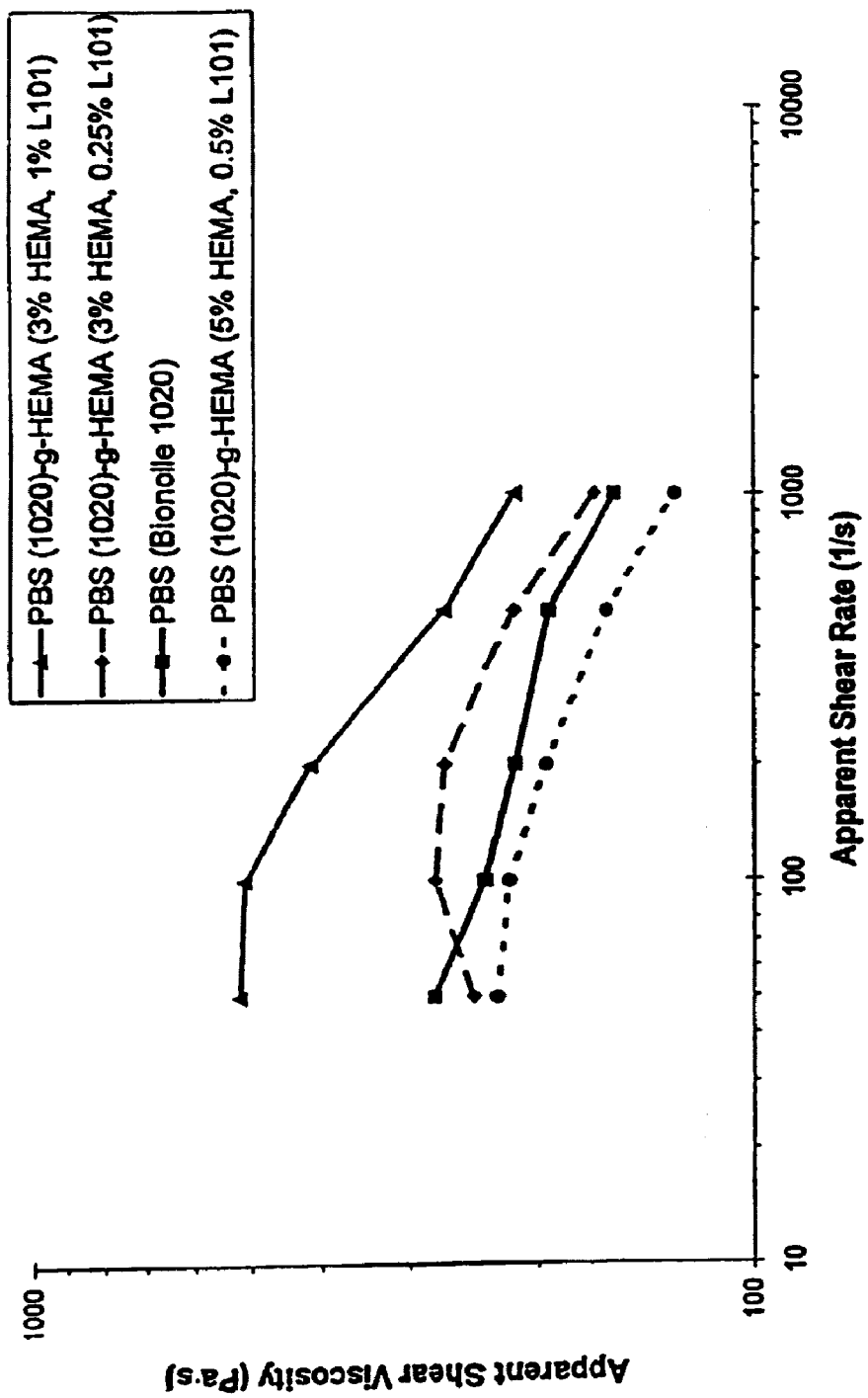
Figure 8. Melt Rheology at 180°C for PBS and HEMA Grafted PBS (Bionolle® 1020)

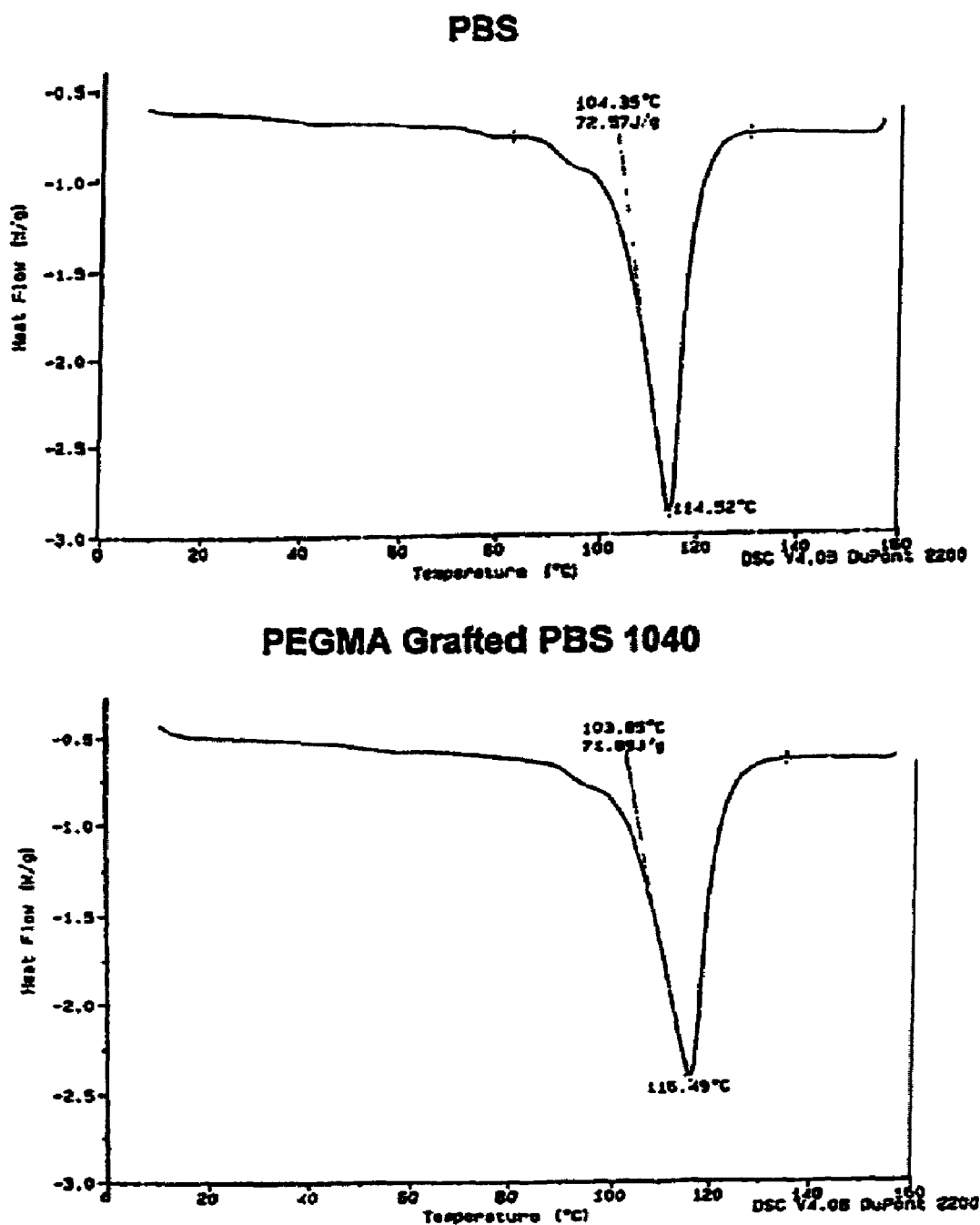
Figure 9. DSC Thermogram for PBS and PEGMA Grafted PBS 1040

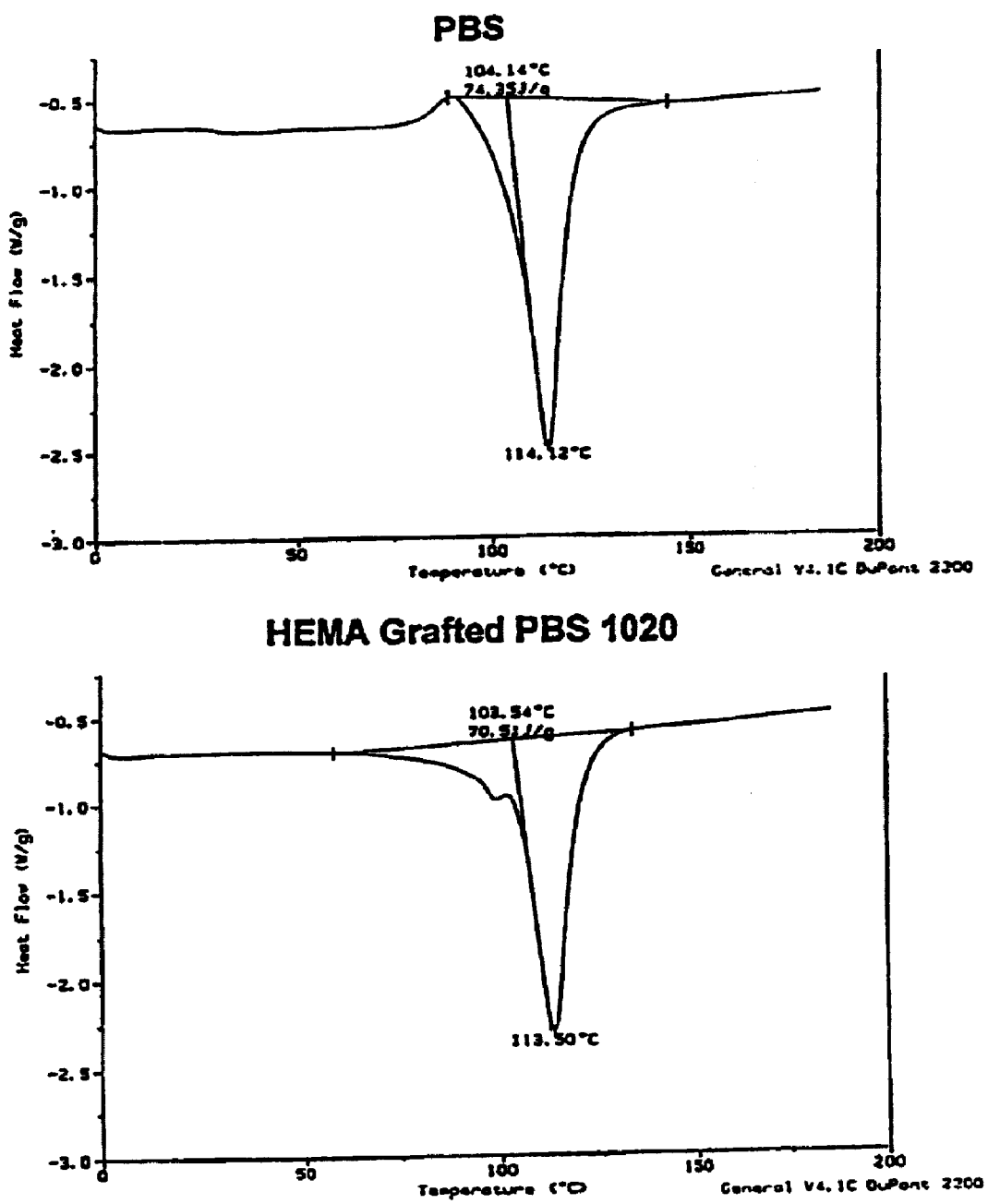
Figure 10. DSC Thermogram for PBS and HEMA Grafted PBS 1020

— 10 μm $\Delta T_m = T_m$ (PEO Phase of Physical Blends) - $T_m$ (Reactive Blends)

Figure 17. DSC Thermograms for PBS/PEO Physical and Reactive Blends
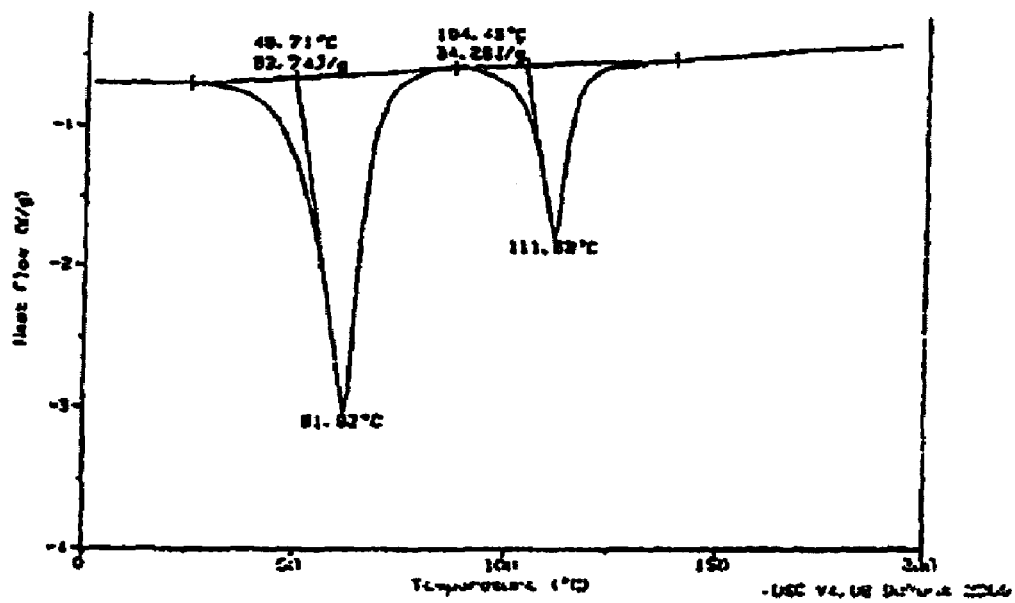
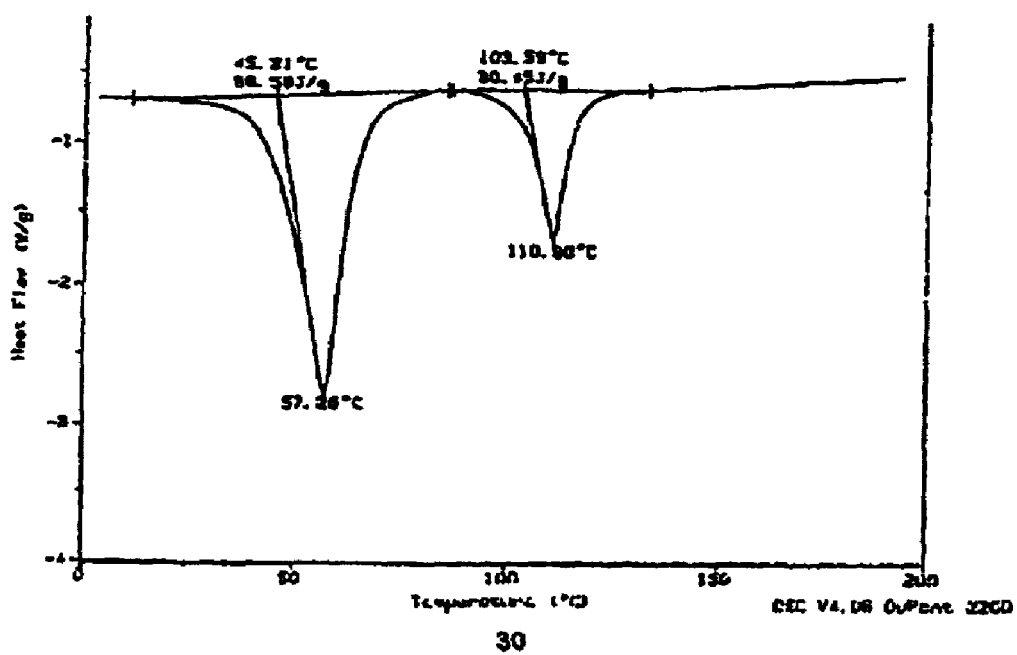

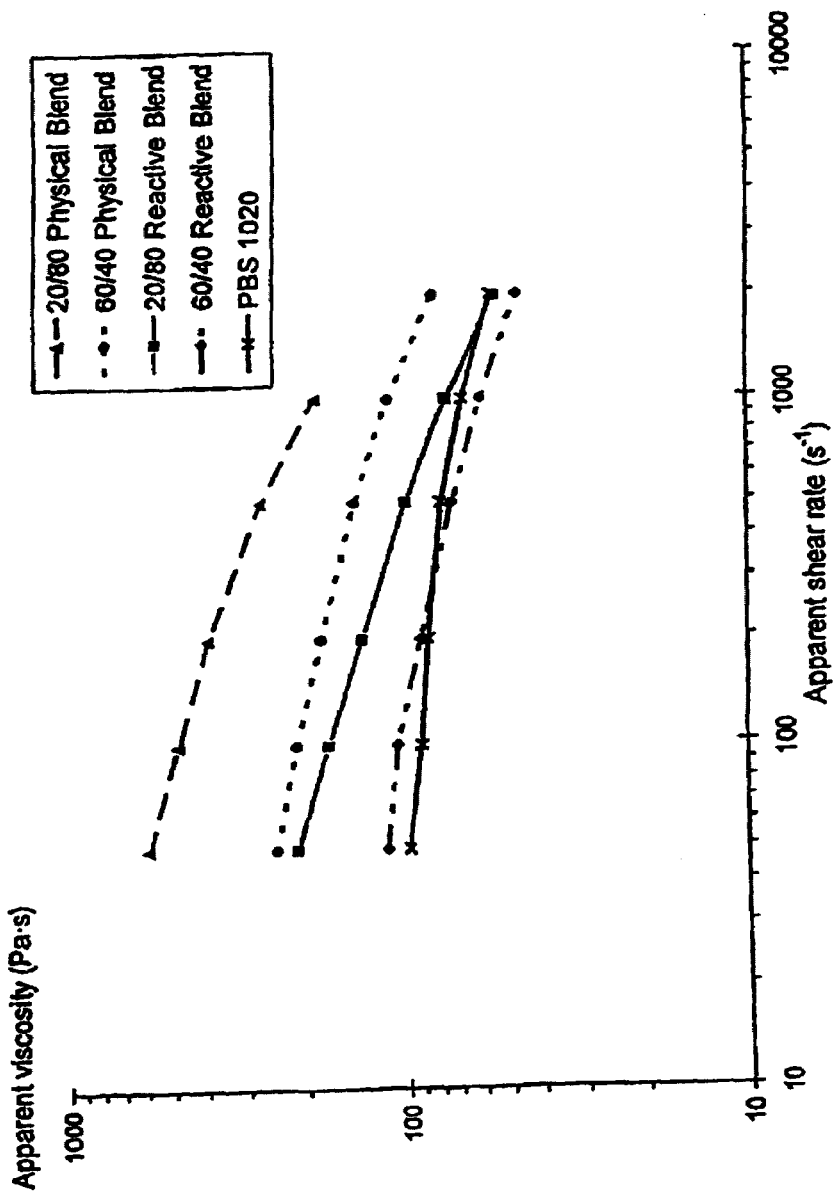
Figure 18. Melt Rheology at 195°C for PBS/PEO Physical and Reactive Blends

GRAFTED BIODEGRADABLE POLYMER BLEND COMPOSITIONS

FIELD OF THE INVENTION

The present invention relates to modified, hydrolytically biodegradable polymers and methods of making modified, hydrolytically biodegradable polymers. More particularly, the present invention relates to a biodegradable polymer selected from poly(hydroxy alkanoates), poly(alkylene succinates) or polycaprolactone modified with a polar monomer and a process of modifying those polymers. In a preferred embodiment, the invention relates to a method of grafting polar functional groups onto a biodegradable polymer selected from poly(β-hydroxybutyrate-co-valerate), poly (butylene succinate) or polycaprolactone and grafted polymer compositions produced by the method.

BACKGROUND OF THE INVENTION

Even though the amount of plastics, hereinafter polymers, used in a variety of consumer goods, packaging and medical articles has not significantly increased over the past twenty years, the common perception is that more and more non-degradable plastics are filling up our limited landfill space. Despite this perceived disadvantage, polymers continue to be used in the manufacture of consumer goods, packaging and medical articles because plastics offer many advantages over the more traditional materials: wood, glass, paper, and metal. The advantages of using polymers include decreased manufacturing time and costs, improved mechanical and chemical properties, and decreased weight and transportation costs. It is the improved chemical resistance properties of the majority of plastics that result in their non-degradability.

Disposal of waste materials, including food waste, packaging materials and medical waste, into a typical landfill provides a relatively stable environment in which none of these materials is seen to decompose at an appreciable rate. Alternative waste disposal options have been increasingly discussed and utilized to divert some fractions of waste from entombment. Examples of these alternatives include municipal solid waste composting, anaerobic digestion, enzymatic digestion, and waste water sewage treatment.

Much controversy is associated with the disposal of medical waste. Both government agencies and members of the private sector have been increasingly directing in-depth scrutiny and funds toward this subject. Admittedly, concerns over the fate of materials contaminated with infectious substances are valid and proper measures to insure the safety of health care workers and the general public should be taken.

Currently, medical waste can be categorized as either reusable or disposable. Categorization as to whether certain waste is reusable or disposable is customarily determined according to the material from which the article was constructed and the purpose for which the article was used.

After use, reusable medical articles are cleansed and sterilized under stringent conditions to ensure disinfection. In comparison, disposable medical articles are usually only used once. Even then, disposing procedures are not straightforward, rather they often involve several steps to safeguard against potential hazards. Typically, after use, disposable medical articles must be disinfected or sterilized, adding a significant cost prior to disposal into a specially designated landfill or waste incinerator. As a result, the disposal cost for the contaminated single use articles is quite high.

Despite the high cost of disposal, single use medical articles are desirable because of the assurance of clean, and uncontaminated equipment. Many times in the medical context, sterilization procedures conducted improperly can result in detrimental effects, such as the transmission of infectious agents from one patient to another. Improper sterilization can also be disastrous in a laboratory setting, where, for example, contaminated equipment can ruin experiments resulting in tremendous costs of time and money.

Currently, disposable medical fabrics are generally composed of thermoplastic fibers, such as polyethylene, polypropylene, polyesters, polyamides and acrylics. These fabrics can also include mixtures of thermoset fibers, such as polyamides, polyarimides and cellulosics. They are typically 10–100 grams per square yard in weight and can be woven, knitted or otherwise formed by methods well known to those in the textile arts while the non-wovens can be thermobonded, hydroentangled, wet laid or needle punched and films can be formed by blown or cast extrusion or by solution casting. Once used, these fabrics are difficult and costly to dispose of and are non-degradable.

The use of polymers for various disposable articles is widespread and well known in the art. In fact, the heaviest use of polymers in the form of films and fibers occurs in the packaging and the disposable article industries. Films employed in the packaging industry include those used in food and non-food packaging, merchandise bags and trash bags. In the disposable article industry, the general uses of polymers occurs in the construction of diapers, personal hygiene articles, surgical drapes and hospital gowns, instrument pads, bandages, and protective covers for various articles.

In light of depleting landfill space and inadequate disposal sites, there is a need for polymers that are water-responsive. Currently, although polymers, such as polyethylene, polypropylene, polyethylene terephthalate, nylon, polystyrene, polyvinyl chloride and polyvinylidene chloride, are popular for their superior extrusion and film and fiber making properties, these polymers are not water-responsive. Furthermore, these polymers are generally non-compostable, which is undesirable from an environmental perspective.

Polymers and polymer blends have been developed which are generally considered to be water-responsive. These are polymers which purportedly have adequate properties to permit them to breakdown when exposed to conditions which lead to composting. Examples of such arguably water-responsive polymers include those made from starch biopolymers and polyvinyl alcohol.

Although materials made from these polymers have been employed in film and fiber-containing articles, many problems have been encountered with their use. Often the polymers and articles made from these polymers are not completely water-responsive or compostable. Furthermore, some water-responsive polymers may also be unduly sensitive to water, either limiting the use of the polymer or requiring some type of surface treatment to the polymer, often rendering the polymer non-water-responsive. Other polymers are undesirable because they have inadequate heat resistance for wide spread use.

Personal care products, such as diapers, sanitary napkins, adult incontinence garments, and the like are generally constructed from a number of different components and materials. Such articles usually have some component, usually the backing layer, constructed of a liquid repellent or water-barrier polymer material. The water-barrier material commonly used includes polymer materials, such as polyethylene film or copolymers of ethylene and other polar and non-polar monomers. The purpose of the water-barrier layer is to minimize or prevent absorbed liquid that may, during use, exude from the absorbent component and soil the user or adjacent clothing. The water-barrier layer also has the advantage of allowing greater utilization of the absorbent capacity of the product.

Although such products are relatively inexpensive, sanitary and easy to use, disposal of a soiled product is not without its problems. Typically, the soiled products are disposed in a solid waste receptacle. This adds to solid waste disposal accumulation and costs and presents health risks to persons who may come in contact with the soiled product. An ideal disposal alternative would be to use municipal sewage treatment and private residential septic systems by flushing the soiled product in a toilet. Products suited for disposal in sewage systems are termed "flushable". While flushing such articles would be convenient, prior art materials do not disintegrate in water. This tends to plug toilets and sewer pipes, frequently necessitating a visit from a plumber. At a municipal sewage treatment plant, the liquid repellent material may disrupt operations by plugging screens and causing sewage disposal problems. In such prior art products, it is therefore necessary, although undesirable, to separate the barrier film material from the absorbent article prior to flushing.

In addition to the article itself, typically the packaging in which the disposable article is distributed is also made from a water-barrier, specifically water-resistant, material. Water-resistivity is necessary to prevent the degradation of the packaging from environmental conditions and to protect the disposable articles therein. Although this packaging may be safely stored with other refuse for commercial disposal, and especially in the case of individual packaging of the products, it would be more convenient to dispose of the packaging in the toilet with the discarded, disposable article. However, where such packaging is composed of a water-resistant material, the aforementioned problems persist.

The use of lactic acid and lactide to manufacture a water-stable polymer is well known in the medical industry. Such polymers have been used in the past for making water-stable sutures, clamps, bone plates and biologically active controlled release devices. Processes developed for the manufacture of such polymers to be utilized in the medical industry have incorporated techniques which respond to the need for high purity and biocompatibility in the final product. These processes, however, are typically designed to produce small volumes of high dollar-value products, with less emphasis on manufacturing cost and yield.

It is generally known that lactide polymers or poly (lactides) are unstable. However, the consequence of this instability has several aspects. One aspect is the biodegradation or other forms of degradation which occur when lactide polymers, or articles manufactured from lactide polymers, are discarded or composted after completing their useful life. Another aspect of such instability is the degradation of lactide polymers during processing at elevated temperatures as, for example, during melt processing by end-user purchasers of polymer resins.

In the medical area, there is a predominant need for polymers which are highly stable and therefore desirable for use in medical devices. Such a demand has historically been prevalent in the high value, low volume medical specialty market, but is now also equally prevalent in the low value, high volume medical market.

As described in U.S. Pat. No. 5,472,518, compositions comprised of multi-layer polymer films are known in the art. The utility of such structures lies in the manipulation of physical properties in order to increase the stability or lifetime during use of such structure. For example, U.S. Pat. No. 4,826,493 describes the use of a thin layer of hydroxybutyrate polymer as a component of a multi-layer structure as a barrier film for diaper components and ostomy bags.

Another example of use of multi-layer films is found in U.S. Pat. No. 4,620,999 which describes the use of a water-soluble film coated with, or laminated to, a water insoluble film as a disposable bag. The patent describes a package for body waste which is stable to human waste during use, but which can be made to degrade in the toilet, at a rate suitable for entry into a sewage system without blockage, by adding a caustic substance to achieve a pH level of at least 12. Such structures usually consist of a polyvinyl alcohol film layer coated with polyhydroxybutyrate.

A similar excretion-treating bag allowing discarding in flush toilet or sludge vessel is disclosed in JP 61-42127. It is composed of an inner layer of a water-resistant polymer, such as polylactide, and an outer layer of a water-dispersible polymer, such as polyvinyl alcohol. As disclosed in this patent, there are many examples of multi-layer films that are utilized in disposable objects. Most of these examples consist of films or fibers which are comprised of internal layers of an environmentally degradable polymer and an external layer of water-responsive polymer. Typically, the internal layers are comprised of polycaprolactone or ethylene vinyl acetate and the external layer is comprised of polyvinyl alcohol. These examples, however, are all limited to compositions consisting of multi-layer of different polymers, and do not encompass actual blends of different polymers.

A family of patents, EP 241178, JP 62-223112 and U.S. Pat. No. 4,933,182, describes a controlled release composition for treating periodontal disease. The controlled release compositions are comprised of a therapeutically effective agent in a carrier consisting of particles of a polymer of limited water solubility dispersed in a water-soluble polymer. Although the carrier of these inventions includes the use of more than one polymer, the disclosed carrier is not a blend because the polymer of limited water solubility is incorporated in the water-soluble polymer as particles ranging in average particle size from 1 to 500 microns.

The use of polymers for use in water-responsive articles is disclosed in U.S. Pat. Nos. 5,508,101; 5,567,510; and 5,472,518. This group of patents discloses a series of water-responsive compositions comprising a hydrolytically degradable polymer and a water-soluble polymer. The compositions of this group, however, consist of articles constructed from polymers which are first formed into fibers or films and then combined. As such, the compositions are actually mini-layers of the individual polymer films or fibers. Therefore, although the fibers and films of the polymers of such compositions are considered to be in very close proximity with one another, they are not as intimate as actual polymer blends. The dispersion of one polymer within another in these compositions is not viewed as approximately uniform since the individual polymers are essentially distinct and separate fibers or films.

U.S. Pat. No. 5,525,671 to Ebato et al. discloses a method of making a linear lactide copolymer from a lactide monomer and a hydroxyl group containing monomer. The polymer disclosed by Ebato is a linear lactide copolymer produced by reacting two monomers to form a linear polymer with a block or random structure. Ebato does not disclose graft copolymers.

Polymer blend compositions for making fibers and films that are optimally combined are desirable because they are highly stable. Optimal combination of polymers means that the polymers are connected as closely as possible without the requirement of co-polymerization. Although physically blended individual polymer compositions are known, improved polymer blends within the fibers and films the individual fibers are microscopically intimately interfaced are desirable since the resulting composition is then more stable, pliable and versatile and most importantly having improved properties and performance.

In addition to the need for polymer compositions that are highly stable, and, therefore, suitable for regular use in most disposable articles, there is a simultaneous need for such polymer compositions to be water-responsive. What is needed therefore, is a material that may be utilized for the manufacture of disposable articles and which is water-responsive. Such material should be versatile and inexpensive to produce. The material should be stable enough for intended use but subject to degradation under predetermined conditions during disposal.

Moreover, there is an increased emphasis on environmentally safe materials and coatings. These coatings reduce the use of solvent-based coatings and rely, to an ever-increasing degree, on polar coatings, such as water-based material. The utility of the graft copolymers of this invention includes, but would not be limited to, materials having a greater affinity for a polar coating.

Therefore, it is an object of this invention to provide a modified, hydrolytically biodegradable polymer.

Another object of this invention is to provide a thermally processable polymer.

Another object of this invention is to provide a commercially viable polymer.

A further object of this invention is to provide a thermally processable, biodegradable polymer which is more compatible with polar polymers and other polar substrates or components.

Still another object of this invention is to provide a modified, hydrolytically biodegradable polymer useful for making flushable, biodegradable articles.

Yet another object of this invention is to provide a modified, hydrolytically biodegradable polymer useful for making blends with improved mechanical and physical properties.

Another object of this invention is to provide a modified biodegradable polymer with improved melt processability.

A further object of this invention is to provide a polymer blend of unique microstructure.

Another object of this invention is to provide a modified biodegradable polymer which has improved compatibility in blends with polar polymers.

Another object of the invention is to provide improved polymer blends comprising poly(β-hydroxybutyrate-co-valerate), poly(butylene succinate) and/or polycaprolactone.

SUMMARY OF THE INVENTION

This invention discloses modified polymer compositions comprised of a biodegradable polymers selected from poly (hydroxy alkanoates), poly(alkylene) succinates or polycaprolactone grafted with a polar monomer, oligomer, or polymer. This invention describes compositions of a polymer selected from poly(hydroxy alkanoates), such as poly (β-hydroxybutyrate), poly(β-hydroxybutyrate-co-β-hydroxyvalerate); poly(alkylene succinates), such as poly (butylene succinate) and poly(ethylene succinate), or polycaprolactone grafted with 2-hydroxyethyl methacrylate or poly(ethylene glycol) methacrylate and a reactive extrusion process for making modified polymer compositions.

Poly(β-hydroxybutyrate-co-valerate), poly(butylene succinate), poly(ethylene succinate) and polycaprolactone are biodegradable polymers which are commercially viable and, in general, thermally processable. By grafting polar monomers onto one or more of poly(β-hydroxybutyrate-co-valerate), poly(butylene succinate) and polycaprolactone, the resulting modified polymer is more compatible with polar polymers and other polar substrates. For flushable material development, the modified polymer compositions of this invention have enhanced compatibility with water-soluble polymers, such as polyvinyl alcohol and polyethylene oxide, than the unmodified biodegradable polymers. The compatibility of modified polymer compositions of the present invention with a polar material can be controlled by the selection of the monomer, the level of grafting and the blending process conditions. Tailoring the compatibility of blends with modified polymer compositions leads to better processability and improved physical properties of the resulting blend.

The water-responsive compositions disclosed in this invention have the unique advantage of being biodegradable so that the compositions and articles made from the compositions can be degraded in aeration tanks by aerobic degradation and anaerobic digestors by anaerobic degradation in wastewater treatment plants. Therefore, articles made from the compositions of this invention will not significantly increase the volume of sludge accumulated at wastewater treatment plants.

In another embodiment of the present invention, there is provided a water-sensitive homogeneous polymer blend composition comprising a biodegradable polymer grafted with a polar monomer, oligomer, or polymer or a combination thereof and a water-soluble polymer.

In another embodiment of the present invention, there is provided a novel polymer composition comprising a blend of a first biodegradable polymer grafted with a polar monomer, oligomer, or polymer or a combination thereof and a second biodegradable polymer grafted with a polar monomer, oligomer, or polymer or a combination thereof, wherein said first and second biodegradable polymers are different polymers.

BRIEF DESCRIPTION OF THE FIGURES

FIG. 1 is a graph of the torque versus time during reactive extrusion of an embodiment of the present invention.

FIG. 2 is a comparative proton NMR spectra for unmodified PHBV and for PHBV grafted with HEMA. FIG. 3 is a graph of the apparent melt viscosities at various apparent shear rates and rheology curves for unmodified PHBV and the HEMA grafted PHBV of Example 1.

FIG. 4 is a graph of DSC curves for PHBV and HEMA grafted PHBV.

FIG. 5 is a graph of the torque versus time during a reactive extrusion of two PEG-MA grafted PBS samples of Example 2.

FIG. 6 is comparative proton NMR spectra for unmodified and grafted PBS from reactive extrusion on the Haake extruder of Example 2.

FIG. 7 is a graph of the melt rheology curves for unmodified PBS and PEG-MA grafted PBS on the Haake extruder of Example 2.

FIG. 8 is a graph of the melt rheology curves for unmodified PBS and HEMA grafted PBS on the ZSK-30 extruder of Example 2.

FIG. 9 is a graph of DSC curves for unmodified PBS and PEG-MA grafted PBS of Example 2.

FIG. 10 is a graph of DSC curves for ungrafted PBS and HEMA grafted PBS of Example 2.

FIG. 17 is a graph of a DSC analysis of PBS/PEO blends showing a comparison between the DSC curves for 30/70 PBS/PEO physical and reactive blends.

FIG. 18 is a graph of the melt rheology curves 20/80 and 60/40 PBS/PEO physical and reactive blends, as well as the melt rheology curve for PBS alone.

DETAILED DESCRIPTION OF THE INVENTION

Figure 11:
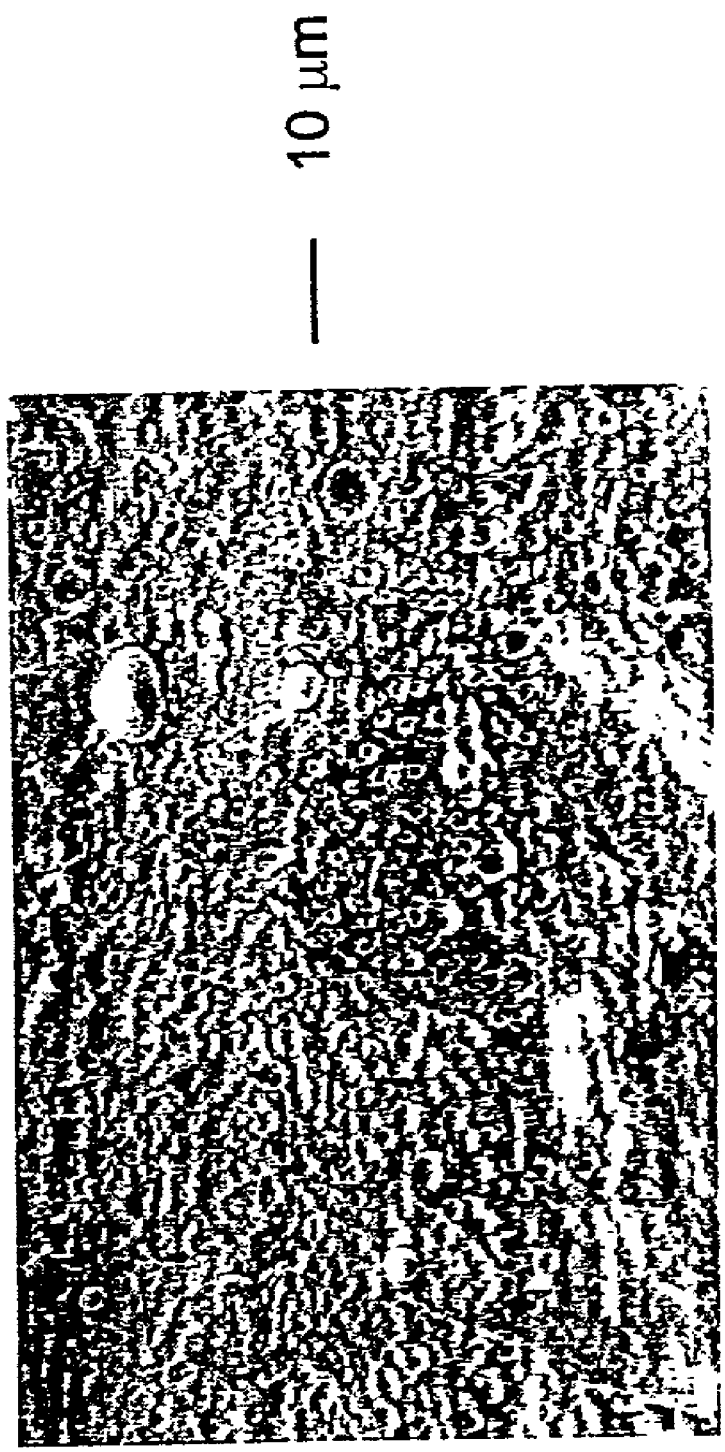
FIG. 11 is a SEM (Scanning electron microscopy) image of the topological morphology of the fracture surface of a film made from a 60/40 blend of PBS/PEO showing a two-phase microstructure.

The present invention comprises a biodegradable polymer which is modified by graft polymerization with a polar monomer, oligomer, or polymer. The present invention also comprises a polymer composition which includes a blend of a biodegradable polymer which is modified by graft polymerization with a polar monomer, oligomer, or polymer and either a water-sensitive polymer or another biodegradable polymer which is modified by graft polymerization with a polar monomer, oligomer, or polymer. The resulting polymer composition can be fabricated into films, fibers, coatings, beads, powders, and the like and can be used to make fabrics, garments, and articles, such as drapes, towels, covers, overwraps, gowns, head coverings, face masks, shoe coverings, CSR wraps, sponges, dressings, tapes, underpads, liners, wash cloths, sheets, pillow covers, napkins, cloth-like outercovers, surgical products and a wound care products. The present invention is also particularly suitable for use for biodegradable personal care products, such as diapers, training pants, feminine tampons, pads and pantiliners, and baffle films therefor, adult incontinence products, wet wipes and/or wipers and any woven, non-woven, or otherwise formed materials. Such products can be employed in the medical industry, both in hospitals and outpatient facilities and in home environments.

Biodegradable polymers that are useful in the present invention include poly(β-hydroxy alkanoates) ("PHA"), such as poly(β-hydroxybutyrate) ("PHB"), polyβ-hydroxy-butyrate-co-β-hydroxyvalerate) ("PHBV"); poly(alkylene succinates) ("PAS"), such as poly(ethylene succinate) ("PES") and poly(butylene succinate) ("PBS"); and polycaprolactones ("PCL") that are hydrolytically degradable. For certain embodiments of the present invention, polylactides ("PLA") are useful as a biodegradable polymer.

Poly(β-hydroxybutyrate-co-β-hydroxyvalerate) ("PHBV") resins can be made by either the fermentation process of carbohydrate and an organic acid by a microorganism; e.g., *Alcaligenes eutrophus,* or by the use of transgenic plants. ("Biodegradable Plastics from Plants," CHEMTECH, September 1996, ppgs. 38–44). PHBV is a biodegradable polymer and has the chemical structure:

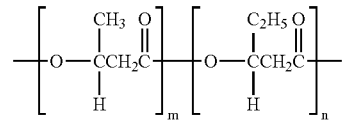

The molecular weight of PHBVs useful in the present invention is not critical to the present invention and can generally be approximately 20,000 to 2,000,000 grams per mol. The PHBV compositions described in the following examples were made by using a grade of PHBV purchased from Zeneca Bio-Products of Wilmington, Del., under the designation Biopol® D600G. The PHBV purchased from Zeneca Bio-Products is biodegradable. Any PHBV can be selected for use in this invention, and the molecular weights of the PHBV may vary depending on the desired properties and use.

Polyalkylene succinate ("PAS") resins are produced by different synthetic methods, such as the reaction product between aliphatic dicarboxylic acids and ethylene glycol or butylene glycol. Poly(butylene) succinate ("PBS") is commercially available from Showa Highpolymer Company of Tokyo, Japan, under the trademark Bionolle®. PBS is a biodegradable polymer and has the chemical structure:

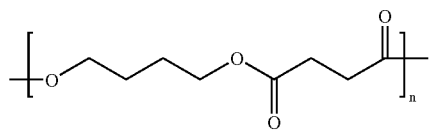

The molecular weight of PAS useful in the present invention is not critical to the present invention and can generally be approximately 20,000 to 2,000,000 grams per mole. The PBS compositions described in the following Examples were made by using a Bionolle® 1020 or 1040 grade PBS purchased from Showa Highpolymer Company. Any PAS can be selected for use in this invention, and the molecular weights of the PAS may vary depending on the desired properties and use.

Polycaprolactone ("PCL") resins are produced by different synthetic methods, such as ring-opening polymerization of ε-caprolactone. A commercial example of polycaprolactone is sold under the trademark Tone® available from Union Carbide of Danbury, Conn. and is a biodegradable polymer with the following chemical structure:

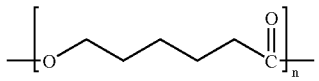

The molecular weight of PCL useful in the present invention is not critical to the present invention and can generally be approximately 50,000 to 1,000,000 grams per mole. The PCL compositions described in the following examples were made by using P-767 and P-787 PCL purchased from Union Carbide Corporation of Danbury, Conn. (Tone® polymers Catalog number UC-261). The PCL purchased from Union Carbide Corporation is biodegradable and has a melt flow of 1.9±0.3 g/min. for P-767 (80° C., 44 psi, ASTM 1238-73) and 1.0±0.2 g/min. (125° C., 44 psi). Any PCL can be selected for use in this invention, and the molecular weights of the PCL may vary depending on the desired properties and use.

Polar monomers, oligomers, or polymers useful in the present invention include ethylenically unsaturated monomers containing a polar functional group, such as hydroxyl, carboxyl, halo-, glycidyl, cyano, amino, carbonyl, thiol, sulfonic, sulfonate, and the like are appropriate for this invention. Examples of polar vinyl monomers useful in the present invention include, but are not limited to, poly(ethylene glycol) acrylate, poly(ethylene glycol) alkyl ether acrylate, poly(ethylene glycol) methacrylate, poly(ethylene glycol) alkyl ether methacrylate, acrylic acid, maleic anhydride, itaconic acid, sodium acrylate, 3-hydroxypropyl methacrylate, 2-hydroxyethyl methacrylate, 3-hydroxypropyl acrylate, 2-hydroxyethyl acrylate, acrylamide, 2-bromoethyl methacrylate, 2-chloroethyl methacrylate, 2-iodoethyl methacrylate, 2-bromoethyl acrylate, 2-chloroethyl acrylate, 2-iodoethyl acrylate, glycidyl methacrylate, 2-cyanoethyl acrylate, glycidyl acrylate, 4-nitrophenyl acrylate, pentabromophenyl acrylate, poly(propylene glycol) methacrylates, poly(propylene glycol) acrylates, 2-propene-1-sulfonic acid and its sodium salt, 2-sulfoethyl acrylate, 2-sulfoethyl methacrylate, 3-sulfopropyl acrylate, 3-sulfopropyl methacrylate or mixtures thereof. Preferred ethylenically unsaturated monomers containing a polar functional group include 2-hydroxyethyl methacrylate (HEMA) and poly(ethylene glycol) methacrylate (PEG-MA). It is expected that a wide range of polar vinyl monomers are capable of imparting polar functionality to the biodegradable polymers and would be effective monomers for grafting.

The grafted biodegradable polymer may contain about 1 to 20 weight percent of grafted polar monomers, oligomers, or polymers. Preferably, the grafted biodegradable polymer contains about 2.5 to 20 weight percent of grafted polar monomers, oligomers, or polymers, and most preferably about 2.5 to 10 weight percent of grafted polar monomers, oligomers, or polymers.

Both the HEMA (Aldrich Catalog number 12,863-8) and the PEG-MA (Aldrich Catalog number 40,954-5) used in the Examples were supplied by Aldrich Chemical Company. The PEG-MA purchased from Aldrich Chemical Company was poly(ethylene glycol) ethyl ether methacrylate having a number average molecular weight of approximately 246 grams per mole. Analogs of HEMA and PEG-MA are also useful in the present invention. Analogs of HEMA include, for example 3-hydroxypropyl methacrylate and 4-hydroxybutyl methacrylate; analogs of PEG-MA have molecular weights ranging from about 200 g/mole to about 10,000 g/mole.

The method for making the grafted biodegradable polymer compositions has been demonstrated by a reactive-extrusion process. The grafting reaction can also be performed in other reaction devices as long as the necessary mixing of biodegradable polymer and polar monomer and any other reactive ingredients is achieved and enough energy is provided to effect the grafting reactions; i.e., by creating free radicals to initiate the grafting reaction process. The reactions are desirably conducted in the polymer melt phase; i.e., in the absence of bulk solvent. This is a highly effective process since the solvent removal step is not needed in the process.

Other reactive ingredients which may be added to the compositions of this invention include initiators, such as Lupersol® 101, a liquid, organic peroxide available from Elf Atochem North America, Inc. of Philadelphia, Pa. Free radical initiators useful in the practice of this invention include acyl peroxides, such as benzoyl peroxide; dialkyl, diaryl, or aralkyl peroxide, such as di-t-butyl peroxide; dicumyl peroxide; cumyl butyl peroxide; 1,1-di-t-butyl peroxy-3,5,5-trimethylcyclohexane; 2,5-dimethyl-2,5-di(t-butylperoxy) hexane; 2,5-dimethyl-2,5-bis-(t-butylperoxy) hexyne-3 and bis(a-t-butyl peroxyisopropylbenzene); peroxyesters such as t-butyl peroxypivalate; t-butyl peroctoate; t-butyl perbenzoate; 2,5-dimethylhexyl-2,5-di(perbenzoate) t-butyl di(perphthalate); dialkyl peroxymonocarbonates and peroxydicarbonates; hydroperoxides, such as t-butyl hydroperoxide, p-methane hydroperoxide, pinane hydroperoxide and cumene hydroperoxide and ketone peroxides, such as cyclohexanone peroxide and methyl ethyl ketone peroxide. Azo compounds, such as azobisisobutyronitrile may also be used.

The amount of free radical initiator in the total mixture compositions which include either biodegradable polymers and/or water-soluble polymers and a polar monomer or a polar vinyl monomer mixture range from about 0.1 to about 1.5 weight percent. At too low an amount of free radical initiator, there is not sufficient initiator present to initiate a grafting reaction. If the amount of free radical initiator is too high, it will create undesirable cross-linking of the polymer composition. Cross-linked polymers are undesirable in the present invention because they cannot be processed into films, fibers or other useful products.

Furthermore, other components known in the art may be added to the graft polymers of this invention to further enhance the properties of the final material. For example, polyethylene glycol may be further added to improve melt flow by reducing melt viscosity. Additives of other types may also be incorporated to provide specific properties as desired. For example, anti-static agents, pigments, colorants and the like may be incorporated into the polymer compositions. Additionally, processing characteristics may be improved by incorporating lubricants or slip agents into blends made from polymers of the invention. All of these additives are generally used in relatively small amounts, usually less than 3 weight percent of the final composition.

The mixture of the biodegradable polymer and the polar monomer, oligomer, or polymer is subjected to mechanical deformation in a suitable mixing device, such as a Brabender Plasticorder, a roll mill, a single or multiple screw extruder, or any other mechanical mixing device which can be used to mix, compound, process or fabricate polymers. A particularly desirable reaction device is an extruder having one or more ports. In a preferred embodiment, the reaction device is a co-rotating, twin-screw extruder, such as a ZSK-30 twin-screw compounding extruder manufactured by Werner & Pfleiderer Corporation of Ramsey, N.J. This extruder allows multiple feeding and venting ports and provides high intensity distributive and dispersive mixing which are essential to produce grafted biodegradable polymers of uniform composition and homogeneous distribution of grafted side chains derived from polar vinyl monomers.

In another embodiment of the present invention, there is provided a novel polymer composition comprising a blend of a first biodegradable polymer grafted with a polar monomer, oligomer, or polymer or a combination thereof and a second biodegradable polymer grafted with a polar monomer, oligomer, or polymer or a combination thereof, wherein the first and second biodegradable polymers are different polymers. The ratio of the two biodegradable polymers useful in the present invention is about 1:99 and 99:1 by weight. A desired first and second biodegradable polymer in this embodiment of the present invention is modified polylactide and modified PHBV. Amount of grafting monomer for either of the modified biodegradable polymers is about 1 to 20 percent by weight of the starting or non-grafted biodegradable polymer.

As disclosed herein, PHBV has a very low cooling rate, such that commercial use of this material is impractical. As further disclosed herein, PLA is too brittle for applications as disclosed herein. However, it has been unexpectedly discovered as a part of the present invention that a blend of PLA and PHBV makes the PHBV cool at an acceptable rate and also makes PLA more flexible such that these material can be used in the products disclosed herein; whereas, either biodegradable polymer alone was unsuitable for such applications.

In another embodiment of the present invention, blends of the modified biodegradable polymer of the present invention and water-soluble polymers may be made. Such blends demonstrate increased water sensitivity of the composition which promoted the rate of hydrolytic degradation of the biodegradable polymers by increasing the exposed surface area of the biodegradable polymer following the dissolution of the water-soluble component. Water-soluble polymers with which the modified biological polymers of the present invention can be blended include polyethylene oxide, polyvinyl alcohol, hydroxypropyl cellulose, polyacrylamide, sulfonated polyesters and polyacrylic acid. The weight fraction of the modified biodegradable polymer in the blend ranges from 1% to 99% by weight. This fraction determines the water responsiveness of the blends. A wide range of water responsiveness includes water-dispersibility, water-disintegratable, water-weakenable and water-stable, as those terms are defined hereinbelow.

The presence of biodegradable polymers or modified biodegradable polymers in blends used to make fibers, films or other shapes reduces the water sensitivity of pure water-soluble polymers, such as polyvinyl alcohol ("PVOH") in use. Biodegradable polymers grafted with a polar monomer or a mixture of monomers is preferred for enhanced compatibility with highly polar water-soluble polymers, such as PVOH, in order to obtain superior processing and mechanical and physical properties. It is possible to use the blends to make other shapes than fibers or films and to thermally form the blends into complex shapes.

As used herein, the term "water-dispersible" means that the composition dissolves or breaks into pieces smaller than the openings of a 20 mesh screen after being immersed in water for approximately five minutes. The term "water-disintegratable" means that the composition breaks into multiple pieces within five minutes of immersion in water and that some of the pieces will be caught by a 20 mesh screen without slipping through in the same manner as a thread through the eye of a needle. The term "water-weakenable" means that the composition remains in one piece but weakens and loses rigidity after five minutes of immersion in water and becomes drapeable; i.e., it bends without an external force applied thereto when it is held by one side at a horizontal position. The term "water-stable" means that the composition does not become drapeable after five minutes of immersion in water and remains in one piece after the water response test.

As used herein, the term "graft copolymer" means a copolymer produced by the combination of two or more chains of constitutionally or configurationally different features, one of which serves as a backbone main chain, and at least one of which is bonded at some point(s) along the backbone and constitutes a side chain. The molar amount of grafted monomer, oligomer or polymer; i.e., side-chain species, may vary but should be greater than molar amount of the parent species. The term "grafted" means a copolymer has been created which comprises side chains or species bonded at some point(s) along the backbone of a parent polymer. The term "blend" as applied to polymers means an intimate combination of two or more polymer chains of constitutionally or configurationally different features which are not bonded to each other. Such blends may be homogeneous or heterogeneous. (See Sperling, L. H., *Introduction to Physical Polymer Science* 1986 pp. 44–47 which is herein incorporated by reference in its entirety.) Preferably, the blend is created by combining two or more polymers at a temperature above the melting point of each polymer.

There are several methods for making the modified biodegradable polymers of the present invention. One method is solution-based grafting method, in which a biodegradable polymer is dissolved in a solvent, to which desired amounts of a free radical initiator and a polar monomer or a mixture of two or more polar monomers, particularly polar vinyl monomers, are added. After sufficient grafting is completed, the solution is purified to remove the solvent and unreacted monomer, resulting in a grafted biodegradable polymer. This method is relatively more labor-intensive and costly as compared to the melt grafting methods disclosed below.

The other method is based on a melt phase reaction in which a molten biodegradable polymer is reacted with a free radical initiator and a polar monomer or mixture of two or more polar monomers, particularly polar vinyl monomers. The melt phase modification is termed "reactive extrusion" in that a new polymer species is created upon the modification reaction. There are several specific methods for carrying out the grafting modification reaction in a melt. First, all of the ingredients, including a biodegradable polymer, a free radical initiator, a polar monomer or a mixture of polar monomers in a predetermined ratio are added simultaneously to a melt mixing device or an extruder. Second, the biodegradable polymer may be fed to a feeding section of a twin screw extruder and subsequently melted, and a mixture of a free radical initiator and polar monomer or mixture of polar monomers, is injected into the biodegradable polymer melt under pressure, the resulting melt mixture is then allowed to react. Third, the biodegradable polymer is fed to the feeding section of a twin screw extruder, then the free radical initiator and polar monomer, or mixture of monomers, are fed separately into the twin screw extruder at different points along the length of the extruder. The heated extruder extrusion is performed under high shear and intensive dispersive and distributive mixing resulting in a grafted biodegradable polymer of high uniformity.

The hydrolytically degradable and water-soluble polymer blend compositions according to the present invention are produced by a melt blending process. It is desired according to the present invention to blend or mix the two components in an extruder, such as a single-screw or twin-screw extruder under appropriate temperature and shear/pressure conditions to ensure mixing. The blending process can also be performed in a batchwise mixing device, such as a melt mixer or a kneader. The modified biodegradable polymer or water-soluble polymer, such as polyvinyl alcohol ("PVOH"), can be fed into the extruder/mixer either simultaneously or in sequence.

The present invention discloses selectively water responsive homogenous polymer blend compositions comprising modified biodegradable polymers and water-soluble polymer blends; e.g., modified biodegradable polymers, such as PHA, PHB, PHBV, PAS, PES, PBS, or PCL graft polymerized with HEMA or PEG-MA, blended with one or more water-soluble polymer, such as polyvinyl alcohol. The term "homogeneous polymer blend composition," as used herein, means that the polymer blend forms a cohesive, continuous structure of modified biodegradable polymer and water-soluble polymer; e.g., polyvinyl alcohol, which is macroscopically homogeneous Microscopically, the size of the dispersed phase is on the order of several microns or less. A homogenous polymer blend composition can be achieved by the mixing of modified biodegradable polymer and water-soluble polymer; e.g., polyvinyl alcohol, at temperatures above the melting point of the polymer having the highest melting point, and below the decomposition point of the polymer having the lowest decomposition point, in order to form a homogeneous molten mixture of the polymers (prior to cooling to a solid form; e.g., films or fibers). For homogenous polymer blend compositions of polylactide and polyvinyl alcohol, the polymer having the higher melting point is polyvinyl alcohol and the polymer having the lower decomposition point is also polyvinyl alcohol. The melting point for polyvinyl alcohol is generally approximately between 180–190° C., and more specifically around 183° C. The decomposition point of polyvinyl alcohol is approximately 210° C. The resulting composition resembles islands of PHBV grafted with HEMA in a sea of polyvinyl alcohol, for example, and at a microscopic level has the appearance of approximately uniform distribution of HEMA grafted PHBV among polyvinyl alcohol. The homogeneous polymer blend composition of the present invention therefore has a very fine dispersion of graft modified biodegradable polymer islands of average size of less than about 0.3–0.4 microns dispersed within a water-soluble polymer.

Based upon the uniformity of dispersion, the "polymer blend" of the present invention is distinguishable from "blended polymers." The compositions of the present invention comprise polymers that are blended above the melting point of the polymer having the highest melting point (e.g., >183° C. for polyvinyl alcohol), and below the decomposition points of the polymer having the lowest decomposition point (210° C. for polyvinyl alcohol) and under high shear; i.e., at a shear rate of 100 s$^{-1}$ or higher. The homogeneous polymer blend composition, therefore, is formed prior to the polymers being formed into films or fibers, resulting in compositions of polymers which are highly, and intimately interconnected, having a selectively uniform dispersion. Such compositions are distinguishable from those comprising blended polymers that consist of polymers which are blended after they have been formed into fibers or films, resulting in compositions which do not have approximate uniform dispersion and often appearing as individual polymers layered or mixed together. Summarily, when individual polymers are blended at temperatures above the melting point of the polymer having the highest melting point, and below the decomposition point of the polymer having the lowest decomposition point and under high mechanical shear, an approximately uniform distribution and dispersion of polymers results. In contrast, when individual polymers are mixed according to standard practices, a blended polymer composition results wherein the polymers are not as integrally associated.

The water sensitivity of the polymer compositions may be controlled according to the degree of the homogeneity of the polymer blends. Mixing, shearing, extrusion and other blending techniques, as well as the relative proportions of the polymer resins used, may be manipulated to determine the microstructure of polymer compositions. The "microstructure" of the polymer blends refers specifically to the size and distribution of graft modified biodegradable polymer islands within the water-soluble polymer sea, for example. The size of the islands may vary from approximately 0.1 to 5.0 µm. Generally, as the size of the islands increases, and/or as the distance between them decreases, the composition gains greater wet mechanical strength and loses pliability in water. For example, for water dispersible compositions, the islands are typically small (approximately 0.2–1.0 µm), and are distributed so that they are far apart from each other. For water disintegratable compositions, the islands are closer together, with a few islands that may even be connected to one another. For water weakenable compositions, the islands can be in very close proximity and a majority of them appear as large clumps.

The method of making films of the present invention effects the morphology of the film. To form a film of finely dispersed graft modified biodegradable polymer of particles that are spherical, near spherical or ellipsoidal, it is desirable to use a non-orienting method to form the film. One non-orienting method of making films is thermomechanical pressing. An example of thermomechanical pressing is described in the examples below. Orienting methods of making films, such as extruding or blowing films, result in films with in which the dispersed phase has a morphology that contains graft modified biodegradable polymer extended into a fibrous structure through the water-soluble polymer continuous phase. Oriented films have reduced water responsiveness and are not dispersible in cold water but are only cold-water weakenable or cold-water disintegratable. The present invention provides improved compositions and methods of making compositions with improved morphologies and cold-water responsiveness.

One embodiment of the present invention is a homogeneous polymer blend composition comprising from about 1 to about 35 weight percent graft modified biodegradable polymer and from about 65 to about 99 weight percent water-soluble polymer, wherein such composition is water dispersible. The composition is characterized by a morphology of fine graft modified biodegradable polymer particles dispersed in a continuous phase of water-soluble polymer. The term "water dispersible," as used herein, means that the composition will dissolve or break into pieces smaller than a 20 mesh after being tested with water at room temperature (18–22° C.) for 2 minutes. "Testing with water," as used herein, means preparing a sample of the composition then immersing it into a scintillation vial filled with water for 5 minutes, followed by shaking the vial for approximately 30 seconds in a mechanical shaking device, and then emptying the contents of the vial through a standard 20 mesh screen.

Another embodiment of the present invention is a homogeneous polymer blend composition comprising from about 35 to about 45 weight percent graft modified biodegradable polymer and from about 65 to about 55 weight percent water-soluble polymer, wherein such composition is water disintegratable. This composition is also characterized by a morphology of fine graft modified biodegradable polymer particles dispersed in a continuous phase of water-soluble polymer. The size of the modified biodegradable polymer domains is larger than those domains for the water-dispersible compositions. The term "water disintegratable" as used herein, means that the composition will break into multiple pieces after 2 minutes and that some of the composition pieces will be caught by a 20 mesh screen.

One other embodiment of the present invention is a composition comprising from about 45 to about 55 weight percent graft modified biodegradable polymer and from about 55 to about 45 weight percent water-soluble polymer, wherein such composition is water weakenable. The composition is characterized by a morphology of fine graft modified biodegradable polymer particles dispersed in a continuous phase of water-soluble polymer. The domain size of modified biodegradable polymer is slightly larger than for the water-disintegratable compositions. The term "water weakenable," as used herein, means that the composition remains in one piece but weakens and loses rigidity after 5 minutes and becomes drapeable; i.e., it bends without an external force applied to the composition when it is held by one corner at a horizontal position. The term "water stable", as used herein, means that the composition does not become drapeable and remains in one piece after testing with water.

For making a composition that is selectively water dispersible, approximately 1–35% graft modified biodegradable polymer and approximately 65–99% water-soluble polymer are combined. For making a composition that is selectively water-disintegratable, approximately 35–45% graft modified biodegradable polymer and approximately 65–55% water-soluble polymer are combined. For making a composition that is selectively water-weakenable, approximately 45–55% graft modified biodegradable polymer and approximately 55–45% water-soluble polymer are combined. For making a composition that is selectively water stable, approximately 55–99% graft modified biodegradable polymer and approximately 45–1% water-soluble polymer are combined.

Another embodiment of the present invention there is disclosed is a reactive polymer blend compositions of a grafted water-soluble polymer, such as grafted PEO or grafted PVOH, and a grafted biodegradable polymer, such as grafted PHBV, grafted poly(alkylene succinates), and grafted polycaprolactones. The ratio of the grafted water-soluble polymer to the grafted biodegradable polymer in the blend of the present invention is between about 1:99 and 99:1 by weight. Examples of grafting monomers, the amounts of grafting monomer relative to the total weight of biodegradable polymers and the water-soluble polymer, the free radical initiators for the grafting reaction and the amount of free radical initiator for the grafting reaction are the same as described above for grafted polymers.

Processing characteristics of the polymer blends for films can be enhanced by the optional incorporation of lubricants or slip agents into the blends. Such lubricants are well known in the art and include TWEEN 20®, TURGITOL® NP 13 available from Union Carbide Corporation (Danbury, Conn.) and various fatty acids and fatty acid derivatives, such as KENAMIDE® E available from Witco Chemical (USA). In addition, the blends may contain other components to enhance the properties of the resulting material. For example, polyethylene glycol can be added to lower the melt viscosity of the melted blend to a range suitable for other processes, such as meltblown process or meltsprayed non-woven-making process. Suitable polyethylene glycols are available from Union Carbide under the trade name CARBOWAX®.

Polymer blending is an important aspect of the manufacture of compositions of the present invention. Depending upon parameters, such as the selection of blending techniques, temperature profiles, and pressure applications, the final water responsive qualities of the compositions may be affected.

The present invention is illustrated in greater detail by the following specific Examples. It is to be understood that these Examples are illustrative embodiments and that this invention is not to be limited by any of the Examples or details in the description. Rather, the claims appended hereto are to be construed broadly within the scope and spirit of the invention.

EXAMPLE 1

Reactive-Extrusion of PHBV with HEMA and PEG-MA

The reactive extrusion chemistry for PHBV grafting is shown below:

Reactive Extrusion Chemistry for Grafting Poly(β-hydroxybutyrate-co-valerate)

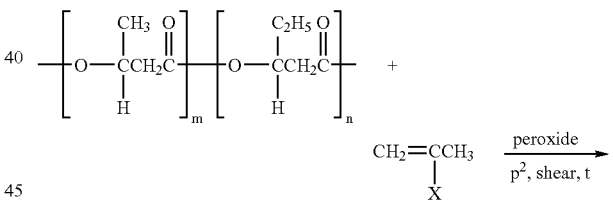

wherein X=—COOCH$_2$CH$_2$OH (HEMA) and —COO—(CH$_2$CH$_2$O)$_n$—C$_2$H$_5$ (PEG-MA), yields a mixture of:

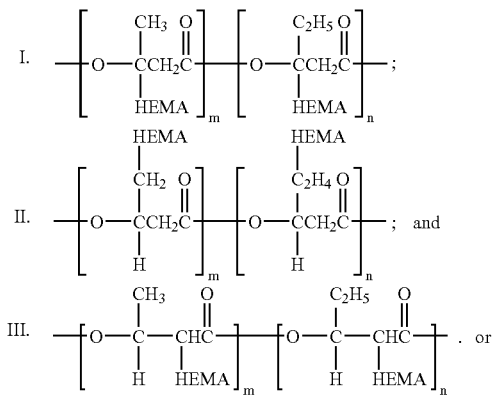

-continued

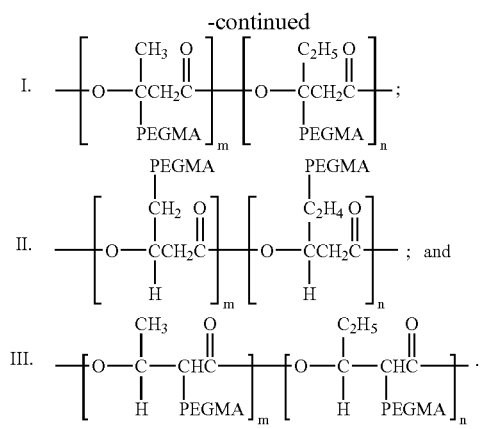

Reactive Extrusion Process

A counter-rotating, twin-screw extruder made by Haake of Paramus, N.J., was used to prepare the grafted PHBV. The extruder had two conical screws of 30 mm at the feed port and 20 mm at the die. The screw length was 300 mm. The PHBV resin (Biopol® P600G from Zeneca Bio-Products) was fed to the feed port, the HEMA monomer and Lupersol® 101 were both fed to the feed port by Eldex pumps. The die used to extrude the modified PHBV strands had two openings of 3 mm in diameter which were separated by 5 mm. The modified PHBV strands were cooled by a water bath. Unlike polylactide ("PLA"), PHBV exhibited extremely slow solidification after initial cooling in water. In fact, the polymer strands could not even be cooled sufficiently in ice water (~0° C.) quickly enough to be pelletized. Interestingly, the grafted PHBV exhibited elastomeric properties in the melt. The strands could easily be stretched and would retract to their initial length. This material property was not observed for grafted PLA or grafted polyolefins. After solidification, the grafted PHBV strands were extremely rigid and brittle. The solidification of both unmodified PHBV and grafted PHBV took several minutes to complete, so the polymer samples were collected in small chunks, allowed to solidify overnight, and were then chipped into small pieces.

The PHBV was fed into the extruder with a volumetric feeder at a throughput of 5.0 lb/hr. The HEMA and the peroxide were injected into the extruder at throughputs of 0.25 lb/hr and 0.020 lb/hr, respectively. In one experiment, the screw speed was 150 rpm.

Two grafted PHBV samples were produced on a Haake extruder. Table 1 below shows the process conditions for the reactive extrusion of PHBV with HEMA on the Haake extruder.

TABLE 1

| | Process Conditions for Preparing HEMA Grafted PHBV | | | | |
|---|---|---|---|---|---|
| Sample I.D. | Temperature (° C.) Zones 1, 2, 3, 4 | Screw Speed (rpm) | Resin Rate (lb/hr) | HEMA rate Lb/hr (% of resin rate) | Initiator rate Lb/hr (% of resin rate) |
| Control | 170, 180, 180, 180 | 150 | 5.0 | 0 | 0 |
| g-PHBV-1 | 170, 180, 180, 175 | 150 | 5.0 | 0.25 (5.0) | 0.020 (0.40) |

TABLE 1-continued

| | Process Conditions for Preparing HEMA Grafted PHBV | | | | |
|---|---|---|---|---|---|
| Sample I.D. | Temperature (° C.) Zones 1, 2, 3, 4 | Screw Speed (rpm) | Resin Rate (lb/hr) | HEMA rate Lb/hr (% of resin rate) | Initiator rate Lb/hr (% of resin rate) |
| g-PHBV-2 | 170, 180, 180, 180 | 150 | 5.0 | 0.50 (10) | 0.025 (0.50) |

The torque on the Haake extruder was monitored during each reactive extrusion. FIG. 1 shows a chart of the torque versus time during the reactive extrusion. At the beginning of the reaction, when the HEMA and peroxide were added, the torque was observed to decrease significantly. When the torque stabilized, the HEMA grafted PHBV sample was collected. When the chemical pumps were stopped and the reactive extrusion was completed, the torque increased to about the level of torque before the reactive extrusion was started. The observed changes in torque during the experiment indicated modification of the polymer and allowed for effective monitoring of the reactive extrusion process. No visible difference was observed between the extruded melt strands of unmodified PHBV and grafted PHBV.

FIG. 2 shows comparative proton NMR spectra for unmodified PHBV and for PHBV grafted with HEMA. The characteristic peak for HEMA monomer ($CH_3$) was observed a 2.0 ppm. This confirmed the modification of PHBV, but did not quantify the amount of HEMA grafted on the PHBV.

Melt rheology tests were performed on the modified and unmodified PHBV on a Goettfert Rheograph 2000 available from Goettfert in Rock Hill, S.C. The modified PHBV of this Example was prepared with 9 weight percent HEMA and 0.45 weight percent Lupersol®. The weight percentages of the HEMA and Lupersol® were based on the weight of the PHBV.

The melt rheology tests were performed at 180° C. with a 30/1 (length/diameter) mm/mm die. The apparent melt viscosity was determined at apparent shear rates of 50, 100, 200, 500, 1000, and 2000 1/s.

The apparent melt viscosities at the various apparent shear rates were plotted and rheology curves for the unmodified PHBV and the HEMA grafted PHBV of the above Example were generated as shown in FIG. 3. The results showed that the unmodified PHBV, over the entire range of shear rates, had higher melt viscosity than the HEMA grafted PHBV. The reduction in melt viscosity was an indication of chemical modification of the PHBV due to reactive extrusion with HEMA.

Table 2 shows the data from differential scanning calorimetry ("DSC") analysis of PHBV and HEMA grafted PHBV samples.

TABLE 2

| DSC Analysis of PHBV and HEMA Grafted PHBV | | | |
|---|---|---|---|
| Sample I.D. | Melting peak-1 (° C.) | Melting peak-2 (° C.) | Enthalpy of melting (J/g) |
| Control | 150.75 | 159.20 | 84.04 |
| g-PHBV-1 | 143.87 | 158.67 | 76.06 |
| g-PHBV-2 | 148.37 | 157.99 | 74.53 |

For the HEMA grafted PHBV samples, both the melting peaks and the enthalpy of melting were observed to decrease compared to unmodified PHBV. The observed changes in thermal properties were an indication of modified crystalline structure and an indirect indication of HEMA grafting. In previous reactive extrusion work, melting peak and enthalpy of melting were also observed to decrease for HEMA grafted polyethylene.

FIG. 4 shows a comparison between DSC curves for PHBV and HEMA grafted PHBV. Both curves show two characteristic melting peaks. The curves display the decrease in melting peaks and enthalpy of melting observed for HEMA grafted PHBV compared to unmodified PHBV. Besides the decrease in melting peaks, the two melting peaks were more separated for the grafted PHBV samples. In addition, the relative ratio of the high temperature melting peak to the low temperature melting peak was increased substantially after grafting, which showed that the properties of the two types of crystalline sizes were changed.

EXAMPLE 2

Reactive-Extrusion of PBS with HEMA

The reactive extrusion process for grafting PBS was carried out on both a Haake extruder as described in Example 1 and a ZSK-30 extruder with two different grades of PBS; i.e., Bionolle® 1040 and Bionolle® 1020. The ZSK-30 extruder was a co-rotating, twin-screw extruder, manufactured by Werner & Pfleiderer Corporation of Ramsey, N.J. The diameter of the extruder was 30 mm. The length of the screws was 1388 mm. This extruder had 14 barrels, numbered consecutively 1 to 14 from the feed hopper to the die. The first barrel, barrel #1, received the PBS and was not heated but cooled by water. The vinyl monomer, HEMA, was injected into barrel #5 and the Lupersol® 101 peroxide by Atochem was injected into barrel #6. Both the monomer and the peroxide were injected via a pressurized nozzle injector. A vacuum port for devolatilization was included at barrel #11.

The reactive extrusion of PBS differed significantly from the reactive extrusion of PLA, PHBV, or polyolefins. In fact, significant differences were observed between the reactive extrusions of the two different grades of PBS carried out on different extruders.

The reactive extrusion chemistry for PBS grafting is shown below:

Reactive Extrusion Chemistry for Grafting Poly(Butylene) Succinate

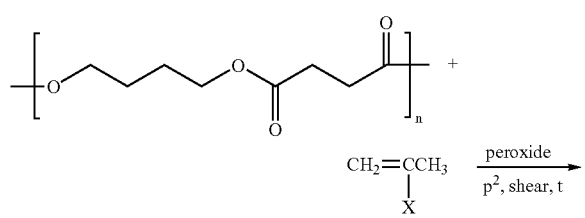

wherein X=—COOCH$_2$CH$_2$OH (HEMA) and —COO—(CH$_2$CH$_2$O)$_n$—C$_2$H$_5$ (PEG-MA), yields a mixture of:

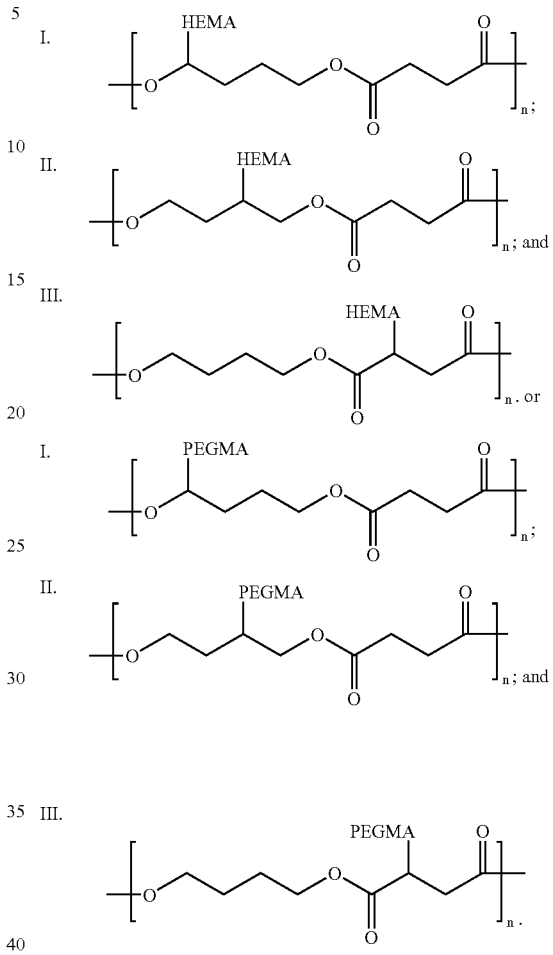

Initially, the extrusion conditions for Bionolle® 1040 reactive extrusion on the Haake extruder were determined. This polymer behaved very differently from PLA or PHBV. In fact, the melt and solid state properties appeared to be very good, appearing more like polyolefins. Two PEG-MA grafted Bionolle® 1040 samples were produced on the Haake extruder. Table 3 below shows the reactive extrusion process conditions for the PEG-MA grafted Bionolle® 1040 experiments on the Haake extruder.

TABLE 3

Reactive Extrusion Process Conditions for Producing PEG-MA Grafted PBS on a Haake Extruder

| Sample I.D. | Temperature (° C.) Zones 1, 2, 3, 4 | Screw Speed (rpm) | Resin Rate (lb/hr) | PEG-MA rate Lb/hr (% of resin rate) | Initiator rate (% of resin rate) |
|---|---|---|---|---|---|
| Control | 160, 180, 180, 180 | 150 | 3.5 | 0 | 0 |
| g-PBS 1040-1 | 160, 180, 180, 180 | 150 | 3.5 | 0.16 (4.6) | 0.010 (0.29) |
| g-PBS 1040-2 | 160, 180, 180, 180 | 150 | 3.5 | 0.31 (8.9) | 0.016 (0.46) |

The torque on the Haake extruder was monitored during reactive extrusion of Bionolle® 1040 with PEG-MA. FIG. 5 shows a chart of the torque versus time during a reactive extrusion of both PEG-MA grafted Bionolle® 1040 samples. At the beginning of the reaction, when the 4.6% PEG-MA and 0.29% peroxide were added, the torque was observed to decrease significantly. When the average torque reached a steady state, the reaction product was determined to have stabilized and the sample was collected. When the chemical pumps were stopped and the reactive extrusion was completed, the torque increased to the level prior to modification. The same observations were made for the 8.9% PEG-MA and the 0.46% Lupersol® 101 peroxide. The PEG-MA grafted Bionolle® 1040 samples appeared to have lower viscosity in the extruded melt strands. No visible gels were observed and the solid properties of the strands appeared to be similar to unmodified Bionolle® 1040.

The extrusion conditions were then determined for the Bionolle® 1020 reactive extrusion on the ZSK-30 extruder. The unmodified Bionolle® 1020 behaved similarly to unmodified Bionolle® 1040 on the Haake extruder. Four HEMA grafted Bionolle® 1020 samples were produced on the ZSK-30 extruder. The reactive extrusion experiments were designed to graft Bionolle® 1020 with HEMA at low levels; i.e., approximately 3% and 5%. Additionally, the effects of peroxide addition were studied at constant HEMA addition levels. Table 4 below shows the reactive extrusion process conditions for HEMA grafted Bionolle® 1020 experiments.

TABLE 4

Reactive Extrusion Process Conditions for Producing HEMA Grafted PBS on a ZSK-30 Extruder

| Sample I.D. | Temperature (° C.) Zones 1–4, 5, 6, 7 | Screw Speed (rpm) | Resin Rate (lb/hr) | HEMA rate Lb/hr (% of resin rate) | Initiator rate (% of resin rate) |
|---|---|---|---|---|---|
| Control | 180, 170, 160, 150 | 300 | 20 | 0 | 0 |
| g-PBS 1020-1 | 180, 170, 160, 150 | 300 | 20 | 0.94 (4.7) | 0.010 (0.50) |
| g-PBS 1020-2 | 180, 170, 160, 150 | 300 | 20 | 0.62 (3.1) | 0.046 (0.23) |
| g-PBS 1020-3 | 180, 170, 160, 150 | 300 | 20 | 0.60 (3.0) | 0.20 (1.0) |
| g-PBS 1020-4 | 180, 170, 160, 150 | 300 | 20 | 0.60 (3.0) | 0.24 (1.2) |

Reactive extrusion parameters, such as time, temperature, % torque, and die pressure, were monitored on the ZSK-30 extruder during reactive extrusion of Bionolle® 1020 with HEMA. Table 5 shows the process conditions during the reactive extrusion of each of the HEMA grafted Bionolle® 1020 samples. The percent torque and melt temperature for each of the HEMA grafted Bionolle® 1020 samples was equal to or greater that unmodified Bionolle® 1020.

TABLE 5

Process Conditions for Reactive Extrusion of Bionelle ® 1020 with HEMA on the ZSK-30 Extruder
ZSK-30 RUN SHEET
Kimberly-Clark
Operators: DMS, GJW
Date/Time: Aug. 8, 1997 9:30 AM
Comments:
Resin: Bionolle ® 1020
Pump 1: HEMA
Pump 2: Lupersol 101

| Time | Resin Feed (lb/hr) | Pump 1 (lb/hr) | Pump 2 (lb/hr) | Screw Speed (rpm) | Torque (%) | KW Power | Zone1 Temp. (° C.) | Zone2 Temp. (° C.) | Zone3 Temp. (° C.) | Zone4 Temp. (° C.) | Zone5 Temp. (° C.) | Zone6 Temp. (° C.) | Zone7 Temp. (° C.) | Melt Temp. (° C.) | Melt Pressure (psi) |
|---|---|---|---|---|---|---|---|---|---|---|---|---|---|---|---|
| CONTROL SAMPLE | | | | | | | | | | | | | | | |
| 9:54 | 19.91 | 0.00 | 0.00 | 299 | 48 | 3 | 180 | 178 | 180 | 180 | 160 | 164 | 168 | 184 | 105 |
| 10:00 | 20.07 | 0.00 | 0.00 | 299 | 48 | 3 | 174 | 185 | 180 | 180 | 171 | 160 | 169 | 182 | 105 |
| SAMPLE #1, 4.7% HEMA and 0.50% Lupersol 101 | | | | | | | | | | | | | | | |
| 11:44 | 19.99 | 0.94 | 0.10 | 300 | 47 | 3 | 177 | 179 | 180 | 180 | 170 | 160 | 147 | 164 | 107 |
| 11:50 | 19.99 | 0.94 | 0.10 | 299 | 49 | 3 | 181 | 180 | 180 | 180 | 170 | 160 | 148 | 165 | 94 |
| 11:54 | 19.91 | 0.94 | 0.10 | 299 | 47 | 3 | 174 | 179 | 180 | 180 | 170 | 160 | 147 | 165 | 101 |
| SAMPLE #2, 3.1% HEMA and 0.23% Lupersol 101 | | | | | | | | | | | | | | | |
| 12:16 | 19.99 | 0.62 | 0.046 | 299 | 52 | 3 | 177 | 181 | 179 | 181 | 170 | 160 | 149 | 167 | 110 |
| 12:30 | 19.99 | 0.62 | 0.046 | 300 | 50 | 3 | 175 | 182 | 179 | 180 | 170 | 160 | 149 | 167 | 132 |
| SAMPLE #3, 3.0% HEMA and 1.0% Lupersol 101 | | | | | | | | | | | | | | | |
| 12:51 | 19.99 | 0.58 | 0.20 | 300 | 54 | 4 | 183 | 182 | 180 | 180 | 170 | 160 | 149 | 168 | 178 |
| 12:58 | 19.99 | 0.62 | 0.20 | 299 | 57 | 4 | 175 | 180 | 180 | 180 | 170 | 160 | 149 | 168 | 181 |
| SAMPLE #4, 3.0% HEMA and 1.2% Lupersol 101 | | | | | | | | | | | | | | | |
| 13:06 | 19.91 | 0.60 | 0.24 | 299 | 58 | 4 | 181 | 181 | 180 | 180 | 170 | 159 | 148 | 168 | 335 |
| 13:14 | 20.07 | .060 | 0.24 | 300 | 60 | 4 | 174 | 180 | 179 | 180 | 170 | 160 | 149 | 168 | 306 |

As the Lupersol® 101 peroxide initiator level was increased to 1.0%, with the HEMA level constant at 3.0%, the melt viscosity increased dramatically. The melt pressure almost doubled compared to unmodified Bionolle® 1020, from 107 psi to 180 psi. The melt strands were much thicker and the polymer appeared to have undergone some crosslinking. When the Lupersol® 101 was increased to 1.2% with the HEMA level at 3.0%, the evidence of crosslinking was even much more apparent. The extruded strands showed dramatic melt fracture and the melt pressure increased even further, compared to unmodified Bionolle® 1020, to about 306 psi. The experiment was discontinued at that point and no sample could be collected at the 1.2% peroxide level. The dramatic changes in properties of HEMA grafted Bionolle® 1020 at low levels of monomer and higher levels of peroxide was believed to be due to a complete crosslinking reaction. The reason the crosslinking reaction was not observed for PEG-MA grafted Bionolle® 1040 on the Haake extruder is believed to be due to one or more of the following factors: (1) different extruder (including different screw configuration and residence time), (2) different polymer (120 has a higher viscosity than 1040), (3) different monomer, and (4) most significantly, lower peroxide level. In previous reactive extrusion experiments with bot polyethylene or polyethylene oxide, as the relative peroxide level was increased, the amount of crosslinking increased, resulting in an increased level of observed gels and melt fracture.

The significant differences in polymer, monomer, extruder and process conditions made comparison difficult between PEG-MA grafted Bionolle® 1040 on the Haake extruder and HEMA grafted Bionolle® 1020 on the ZSK-30 extruder. However, the significant of this series of experiments with HEMA grafted Bionolle® 1020 was that the reactive extrusion and polymer properties were significantly different from each of the previous biodegradable reactive extrusion experiments, with PLA, PHBV, or PBS on the Haake extruder.

FIG. 6 shows comparative proton NMR spectra for unmodified and grafted Bionolle® 1040 from reactive extrusion on the Haake extruder. The characteristic peak for grafted PEG-MA monomer (CH$_3$) was observed at 1.0 ppm. The PEG-MA grafting level was determined to be 0.51% by weight of PBS.

Melt rheology was studied for unmodified Bionolle® 1020 and 1040, PEG-MA grafted Bionolle® 1040 on the Haake extruder, and HEMA grafted Bionolle® 1020 on the ZSK-30 extruder. The measurement was carried out on a Göettfert capillary rheometer at 180° C. following the procedure described in the Experimental section.

FIG. 7 displays the melt rheology curves for unmodified Bionolle® 1040 and PEG-MA grafted Bionolle® 1040 on the Haake extruder. The results show that the PEG-MA grafted Bionolle® 1040, over the entire range of shear rates, had lower melt viscosity than the ungrafted Bionolle® 1040. In fact, as the amount of added PEG-MA was increased from 4.5% to 9%, the melt viscosity further decreased. The results were similar to the results for PHBV and PLA grafting. The observed decrease in melt viscosity of PEG-MA grafted Bionolle® 1040 with increasing amounts of added monomer was also similar to the observed effects for PEG-MA grafted polypropylene and polyethylene in previous reactive extrusion work.

FIG. 8 displays the melt rheology curves for unmodified Bionolle® 1020 and HEMA grafted Bionolle® 1020 on the ZSK-30 extruder. The melt rheology properties of the grafted material correlated with the observed reactive extrusion properties. The 5% HEMA sample, at low relative peroxide level, showed a slight decrease in melt viscosity compared to unmodified Bionolle® 1020. Both of the 3% HEMA samples showed increased melt viscosity compared to unmodified Bionolle® 1020. The 3% HEMA samples also showed increased melt viscosity with increased peroxide addition levels, resulting from the crosslinking of the Bionolle® 1020 polymer. The 3% HEMA sample at 1.2% peroxide addition could not be collected, so no melt rheology data was collected.

Table 6 shows the data from DSC analysis of unmodified Bionolle® 1040 and PEG-MA grafted Bionolle® 1040 samples produced on the Haake extruder.

TABLE 6

DSC Analysis of Bionolle® 1040 and PEG-MA Grafted Bionolle® 1040

| Sample I.D. | Melting peak (° C.) | Enthalpy of melting (J/g) |
| --- | --- | --- |
| Control | 114.52 | 72.57 |
| g-PBS 1040-1 | 116.49 | 71.89 |
| g-PBS 1040-2 | 117.57 | 81.45 |

Table 7 shows the DSC data for unmodified Bionolle® 1020 and HEMA grafted Bionolle® 1020 samples produced on the ZSK-30 extruder.

TABLE 7

DSC Analysis of Bionolle® 1020 and HEMA Grafted Bionolle® 1020

| Sample I.D. | Melting peak (° C.) | Enthalpy of melting (J/g) |
| --- | --- | --- |
| Control | 114.12 | 74.35 |
| g-PBS 1020-1 | 113.72 | 71.20 |
| g-PBS 1020-2 | 112.82 | 67.54 |
| g-PBS 1020-3 | 113.50 | 70.51 |

The PEG-MA grafted Bionolle® 1040 on the Haake extruder showed an increase in the melting peak compared to unmodified Bionolle® 1040. This result was unexpected because, typically, grafted polymers have shown a decrease in melting peak upon grafting. FIG. 9 shows a comparison between DSC curves for unmodified Bionolle® 1040 and PEG-MA grafted Bionolle® 1040.

The HEMA grafted Bionolle® 1020 on the ZSK-30 extruder showed both a decrease in melting peak and the enthalpy of melting compared to unmodified Bionolle® 1020. FIG. 10 shows a comparison between DSC curves for ungrafted Bionolle® 1020 and HEMA grafted Bionolle® 1020. The observed changes in thermal properties were an indication of modified crystalline structure and an indirect indication of HEMA grafting. The observed decrease in melting peak and enthalpy of melting was more typical of grafted polymers, such as HEMA grafted PHBV or previous HEMA grafted polyester work.

EXAMPLE 3

Reactive-Extrusion of PCL with HEMA

This example shows the reactive extrusion procedure for making grafted PCL. The same ZSK-30 twin screw extruder as in Example 2 above was used. Tone® P-787 PCL was fed to the feed throat of the ZSK-30 twin screw extruder at a rate of 20 lbs/hr. HEMA was fed to barrel #5 at a rate of 0.36 lbs/hr (1.8% by weight of PCL resin) and Lupersol® 101 peroxide was fed to barrel #6 at a rate of 0.03 lbs/hr (0.15% by weight of PCL resin). The screw speed was 300 rpm.

The following temperatures were recorded during this grafting process:

| Zone 1 | Zone 2 | Zone 3 | Zone 4 | Zone 5 | Zone 6 |
| --- | --- | --- | --- | --- | --- |
| 171° C. | 178° C. | 180° C. | 181° C. | 180° C. | 180° C. |

The melt temperature was 214° C. The measured melt pressure was 422 psi. The vacuum on the vent port (on barrel #11) was 24.49 inches Hg to remove unreacted HEMA monomer.

The resulting grafted PCL was cooled in a water bath, and pelletized into white colored pellets. The grafted PCL strands were strong and ductile. The surface of the strands and pellets were shiny.

The film casting of the grafted PCL was performed on the Haake twin screw extruder described in Example 1 fitted with an 8-inch film die (by Haake). The film was cooled by a chill roll cooled by water at room temperature. The extruder had four heating zones with temperatures set at 120° C., 130° C., 130° C., 140° C., respectively. The screw speed was 40 rpm. The extruder was flood fed with the grafted PCL. The measured melt temperature was 136°–137° C. The melt pressure was in the range from 800 to 1,100 psi. Thin films of about 1.5 mil in thickness were obtained. The film of grafted PCL was strong, shiny and ductile. The film was clear and transparent. The grafted PCL film had significantly improved film clarity compared to film made from unmodified PCL, which was opaque.

The grafted PCL melt was stickier than un-grafted PCL which indicated potential as an adhesive for hot melt uses.

EXAMPLE 4

Water Responsive Films of Biodegradable Polymer and a Water-Soluble Polymer

The ZSK-30 twin screw extruder described in Example 2 was used to make a series of blends of biodegradable polymer and a water-soluble polymer.

The first series of experiments used Bionolle® 1020 PBS as the biodegradable polymer. PVOH was used as the water-soluble polymer.

PVOH (Airfoil® 203, by Air Products) control was extruded at a rate of 20 lbs/hr. The extruder temperatures were set at 110° C. at zone 1 and 150° C. at zones 2 and 3, 160° C. at zone 4, 170° C. at zone 5, and 180° C. at zones 6 and 7. The melt temperature was 199° C. The melt pressure was 197 psi. The screw speed was 300 rpm. The film produced was clear and water-soluble.

The same conditions described above for the control were used to extrude samples of polymer blends. Bionolle® 1020 PBS and Airvol® 203 PVOH were fed separately to the extruder by two gravimetric feeders so as to produce a blend of 80% by weight PVOH and 20% by weight PBS. The melt pressure was 174 psi. The melt temperature was 199° C. The extruded strands were smooth and well formed.

EXAMPLE 5

Water Responsive Films of Biodegradable Polymer and a Water-Soluble Polymer

The same procedure was followed as in Example 4 above, except that the PBS and PVOH were fed at a rate so as to produce a blend of 70% by weight PVOH and 30% by weight PBS. The melt pressure was 192 psi. The melt temperature was 198° C. The extruded strands were smooth and well formed.

EXAMPLE 6

Water Responsive Films of Biodegradable Polymer and a Water-Soluble Polymer

The same procedure was followed as in Example 4 above, except that the PBS and PVOH were fed at a rate so as to produce a blend of 60% by weight PVOH and 40% by weight PBS. The melt pressure was 202 psi. The melt temperature was 197° C. The extruded strands were smooth and well formed. The strands of extruded polymer were then converted to pellets.

EXAMPLE 7

Films Made from Blends Comprising PVOH and PBS

The pellets made in Examples 4 to 6 were made into films by a melt extrusion casting process using a Haake twin screw extruder, such as described in Example 1. The extruder was set with temperatures for the four zones as follows: 170° C., 180° C., 180° C. and 190° C. The screw speed was 100 rpm. The films produced were 1 mil in thickness.

The films produced from the pellets of Example 4 were water-dispersible within 2 minutes in water at 22° C. The films produced using the pellets of Example 5 were water-dispersible within 2 minutes in water at 22° C. The films produced using the pellets of Example 6 were water-dispersible within 2 minutes in water at 22° C.

EXAMPLE 8

Blends of Modified Biodegradable Polymer and Modified Water-Soluble Polymer

The same ZSK-30 twin screw as described in Example 2 above was used for the following example. Two gravimetric feeders were used to feed two different polymers simultaneously to the feed throat of the extruder. PCL and a water-soluble polymer from National Starch and Chemical Co., Bridgewater, N.J., having the designation NS 70-4442. NS 70-4442 is a water-soluble sulfonated polyester polymer. The PCL was fed to the extruder at a feed rate of 16 lbs/hr; the NS 70-4442 was fed at a rate of 4 lbs/hr. The feed rates produced a ratio of PCL:NS 70-4442 of 80:20 by weight. HEMA was injected to barrel #5 by an Eldex pump at a rate of approximately 0.4 lbs/hr. Lupersol® 101 was injected to barrel #6 at a rate of 0.032 lbs/hr by an Eldex pump. The screw speed was 300 rpm. The temperatures were:

| Zone 1 | Zone 2 | Zone 3 | Zone 4 | Zone 5 | Zone 6 | Zone 7 |
| --- | --- | --- | --- | --- | --- | --- |
| 175° C. | 180° C. | 180° C. | 179° C. | 180° C. | 180° C. | 190° C. |

The melt temperature measured was 209° C. The melt pressure was 258 psi. The strands were cooled on a fan-cooled conveyor belt and subsequently were pelletized. The strands and pellets had smooth surfaces.

Cast films were made from the pellets on a Haake twin screw extruder as previously described. The film showed water-sensitivity; i.e., reduced stiffness, increased deformability and softness.

EXAMPLE 9

Blends of Modified Biodegradable Polymer and Modified Water-Soluble Polymer

The same procedure as described in Example 8 above was followed, except the feed rates were 18 lbs/hr for the PCL and 12 lbs/hr for the NS 70-4442 which produced a ratio of PCL:NS 70-4442 of 60:40 by weight. The temperatures were:

| Zone 1 | Zone 2 | Zone 3 | Zone 4 | Zone 5 | Zone 6 | Zone 7 |
|---|---|---|---|---|---|---|
| 179° C. | 183° C. | 179° C. | 180° C. | 180° C. | 191° C. | 210° C. |

The melt temperature was 210° C. The melt pressure was 158 psi. The films made from the blended composition were water-sensitive. The water-sensitivity of the films may be improved by increasing the amount of NS 70-4442 in the blend, thereby rendering the film water-dispersible or water-disintegratable.

EXAMPLE 10

Polylactide (PLA) was supplied by Aldrich Chemical Company, Catalog # 43232-6. Poly(butylene) succinate (PBS) was supplied by Showa Highpolymer Company under the name Bionolle® 1020. Polyvinyl alcohol (PVOH) was supplied by Nippon Gohsei under the trade name Ecomaty® AX10000.

PLA grafted with 2-hydroxyethyl methacrylate was used. The grafted PLA was produced, by reactive extrusion on a Werner & Pfleiderer ZSK-30 twin screw extruder. The procedure for making the grafted PLA is described in foregoing examples.

2-Hydroxyethyl methacrylate (HEMA) and polyethylene glycol ethyl ether methacrylate (PEG-MA) with a molecular weight of 246 g/mol, both supplied by Aldrich Chemical Company, were used as reactive polar vinyl monomers. The peroxide initiator used was Lupersol® 101, supplied by Atochem.

Blends were produced using a Rheomix® 600 twin roller mixer (manufactured by Haake). The mixer had three heating zones, one each for the front plate, mixing chamber, and back plate. The temperatures for the zones, screw speed and mixing time were controlled by computer.

A typical polymer blending experiment on the Haake mixer was performed as follows: The mixer was preheated to 180° C. A specified amount of PLA or grafted PLA and PVOH was added to the mixer and the material was mixed for five minutes at a screw speed of 150 rpm. After five minutes, the melt was removed from the mixer and cooled in air.

Blends were also produced using a TW-100 screw extruder (manufactured by Haake) with three barrels and 300 mm processing length. The unit contained a set of custom-made, counter-rotating, conical twin screws. The feed section was not heated and was cooled with water. The extruder had three heating section designated as Zone 1, Zone 2 and Zone 3 from the feeding section toward the die. The die was designated as Zone 4. The die had two openings of 3 mm diameter which were separated by 10 mm.

A typical polymer blending experiment on the Haake extruder was performed as follows: The heating zones were preheated to 170°, 180°, 180° C. The extruder was set at 150 rpm. Pellets of PLA or grafted PLA were mixed at a specified ratio with pellets of PVOH. The mix of resin pellets was continuously cooled twice and pelletized twice.

In contrast to the two-step approach, a novel process for flushable and biodegradable polymer development was developed in which only one extrusion pass was employed. This process is called reactive blending. In the reactive blending process, a biodegradable polymer and a water-soluble polymer are blended while they are reactively grafted with the polar monomer. At the end of the extruder, the melt is extruded, cooled and pelletized.

The reactive blend has the potential to contain one or more of several unreacted and reacted products. Some portion of unreacted biodegradable and water-soluble polymer may remain in the final reactive blend. Grafted biodegradable and water-soluble polymers are possible reaction products in the reactive blend. Also, the reactive blend may contain some reactively connected biodegradable and water-soluble polymers, which would be novel compositions of matter.

Compared to the two-step process, the single-step, reactive blending process offers a number of advantages and benefits: 1) it is a lower cost process since only one extrusion, cooling and pelletizing cycle is required, rather than two; 2) it reduces polymer degradation because of one less extrusion pass; and 3) it causes less variation in the polymer blend composition and the quality of the resulting blends.

Reactive blending was carried out on the Haake TW-100 twin screw extruder described above. A typical reactive blending experiment on the Haake extruder was performed as follows: The heating zones were preheated to 160°, 180°, 180°, 190° C. The extruder was set at 150 rpm. Pellets of PBS were mixed at a specified ratio with pellets of PEO. The mix of resin pellets was fed into the Haake extruder with a volumetric feeder at a throughput of 5 lb/hr. PEG-MA was added at the feeding section at 0.40 lb/hr and Lupersol® 101 was added at the feeding section at 0.025 lb/hr. After adding PEG-MA and Lupersol® 101, the torque decreased and then stabilized. The process was allowed to reach equilibrium and the extruded strands were cooled in air and pelletized.

Reactive blends of PBS and PEO with PEG-MA were converted into thin films using the Haake extruder described above, except a 4-inch or 8-inch slit die was used instead of the two-strand die. A chilled wind-up roll maintained at 15°–20° C. was used to collect the film. Adjustments in die gap, screw speed and wind-up speed were used to optimize film processing and film thickness.

A typical film-converting run on the Haake extruder was performed as follows: the selected reactive blend pellets were flood feed into the feeding section. The temperature profile for the four heating zones was 170°, 180°, 180° and 190° C. The melt temperature at the die was 195° C. The screw speed was 30 rpm. The wind-up speed was 70% of maximum. The process conditions were adjusted to produce a film thickness of approximately 4 mils. The process was allowed to stabilize and the film was collected.

Dry tensile tests were performed on a Sintech 1/D tensile tester under the following conditions: gauge length—30 mm, crosshead speed—4 mm/s, narrow width of dogbone—3.18 mm. Wet tensile tests were also carried out on the Sintech 1/D tensile tester under the same conditions, except the films were submerged underwater during testing. A water tank was used for wet tensile tests. Peak stress, percent strain-to-break, energy-to-break (area under stress versus strain curve), and modulus were calculated for each film test and the percent loss in tensile properties from dry to wet was determined.

DSC was performed on a TA Instruments DSC 2910. 10–15 mg of film sample was used for each test. The following method was followed for each test: 1—equilibrate at -20° C., 2—isothermal for 1 minute, 3—ramp at 20° C./minute to 200° C., 4—ramp at 30° C./minute to 30° C.

Melt rheology tests were performed on a Göettfert Rheograph 2003 with a 30/1 mm L/D die at 195° C. (the observed melt temperature for most film-converting runs). The apparent melt viscosity for each material was determined at apparent shear rates of 50, 100, 200, 500, 1000, 2000 s$^{-1}$. A rheology curve was plotted for each material of apparent viscosity versus apparent shear rate.

Wet tensile properties of the PBS/PEO physical and reactive blends were tested and compared to the dry tensile properties. Table 8 and 9 show the dry and wet tensile properties for the 20/80, 30/70 and 40/60 physical and reactive blend films, respectively. The percent loss in tensile properties from dry to wet for strain, strength, toughness and rigidity was also recorded. The 50/50 and 60/40 blends were water-sensitive, but are not included because they did not significantly lose tensile properties in water.

TABLE 8

Dry and Wet Tensile Properties of PBS/PEO Physical Blend Films

| | Bionolle ®/PEO | | | | | |
|---|---|---|---|---|---|---|
| | 20/80 | | 30/70 | | 40/60 | |
| | dry | wet | dry | wet | dry | wet |
| Thickness (mil) | 2.5 | 2.7 | 3.3 | 3.1 | 2.4 | 2.9 |
| % Strain | 480 | 370 | 490 | 780 | 450 | 840 |
| Peak Stress - (MPa) | 18.4 | 3.0 | 27.9 | 12.4 | 20.0 | 18.8 |
| Energy-break (×10$^6$ J/m$^3$) | 69.4 | 8.0 | 91.7 | 71.3 | 86.3 | 110.2 |
| Modulus (MPa) | 304 | 15.2 | 353 | 31.3 | 402 | 54.6 |
| Percent Loss from Dry to Wet | | | | | | |
| Strain | 23% | | -59% | | *-86%* | |
| Strength | 84% | | 56% | | 35% | |
| Toughness | 89% | | 22% | | -28% | |
| Rigidity | 95% | | 91% | | 86% | |

TABLE 9

Dry and Wet Tensile Properties of PBS/PEO Reactive Physical Blend Films

| | Bionolle ®/PEO Reactive Blend w/10% PEG-MA | | | | | |
|---|---|---|---|---|---|---|
| | 20/80 | | 30/70 | | 40/60 | |
| | dry | wet | dry | wet | dry | wet |
| Thickness (mil) | 3.1 | 2.6 | 3.3 | 3.5 | 3.2 | 3.0 |
| % Strain | 500 | 210 | 440 | 440 | 430 | 783 |
| Peak Stress - (MPa) | 15.8 | 1.0 | 21.7 | 3 | 24.4 | 15.6 |
| Energy-break (×10$^6$ J/m$^3$) | 57.5 | 1.4 | 64.9 | 9.3 | 69.2 | 86.3 |
| Modulus (MPa) | 218 | 9.1 | 243 | 22.6 | 243 | 40.2 |

TABLE 9-continued

| | Percent Loss from Dry to Wet | | |
|---|---|---|---|
| Strain | 58% | 0% | *-82%* |
| Strength | 94% | 86% | 36% |
| Toughness | 98% | 86% | *-25%* |
| Rigidity | 96% | 91% | 83% |

For the 20/80 and 30/70 compositions, the reactive blends lost a greater percentage of tensile properties from dry to wet compared to the physical blends, which is very desirable for flushable applications. The relative loss in tensile properties from dry to wet was obviously improved for the reactive blend film.

Surprisingly, the physical and reactive blends of 40/60 PBS/PEO showed increased percent strain-to-break. Additionally, the physical blend of 30/70 PBS/PEO showed an increase in percent strain-to-break. In fact, when these blends were exposed to water, the films appeared to have somewhat elastomeric properties. These observations were quite surprising, because similar blends of other polymer systems had always shown a decrease in tensile properties after the majority water-soluble component dissolved in water. Plasticization effects due to hydration of PEO, the unique "layered" morphology of PBS/PEO physical and reactive blends, and the interaction between PBS and PEO must have contributed to the unique wet tensile properties of these blends. The elastomeric properties of the reactive blends may even show the potential for development as a gasket for fit improvement, while remaining flushable.

Figure 12:
FIG. 12 is a SEM image of the topological morphology of the fracture surface of a film made from a 60/40 blend of grafted PBS/grafted PEO showing a two-phase microstructure and improved compatibility.

FIGS. 11 and 12 show SEM (Scanning electron microscopy) images of the topological morphology of the fracture surface of 60/40 PBS/PEO physical and reactive blends films. In FIG. 11, a two-phase microstructure was observed for the physical blend. The adhesion between the PBS continuous phase and the PEO dispersed phase was quite poor, as shown by the presence of holes left by PEO particles which pulled away from the PBS at the interface of the two phases. In FIG. 12, the compatibility of PBS and PEO was dramatically improved for the reactive blend. In fact, no second phase is visible in the SEM photomicrograph of the reactive blend film. This observation suggested either high compatibility, or possibly, even miscibility of PBS and PEO upon reactive blending.

Figure 13:
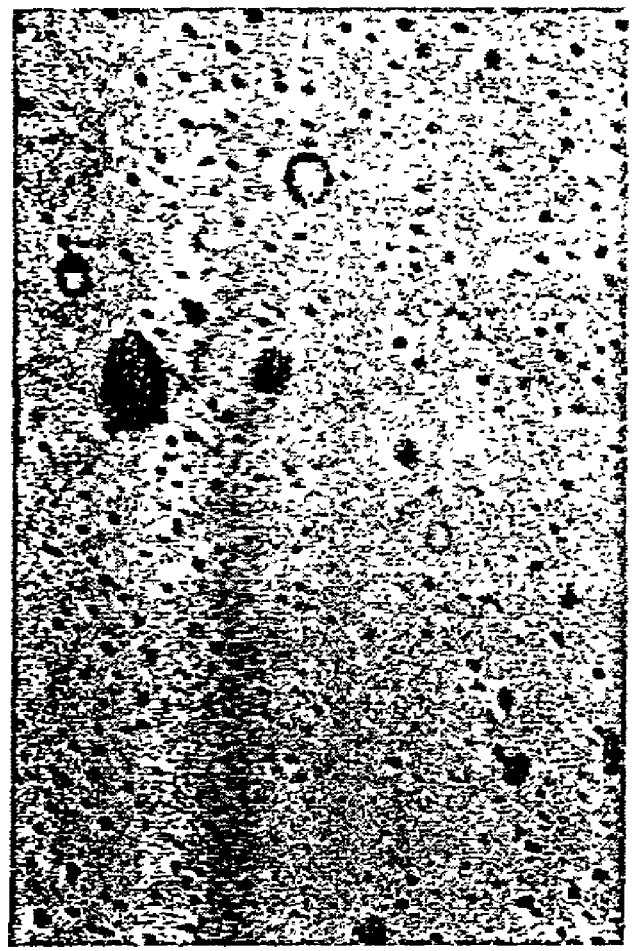
FIG. 13 is a SEM image using BEI (back-scattered electron imaging) of the topological morphology of the fracture surface of a film made from a 60/40 blend of PBS/PEO showing a two-phase microstructure.
Figure 14:
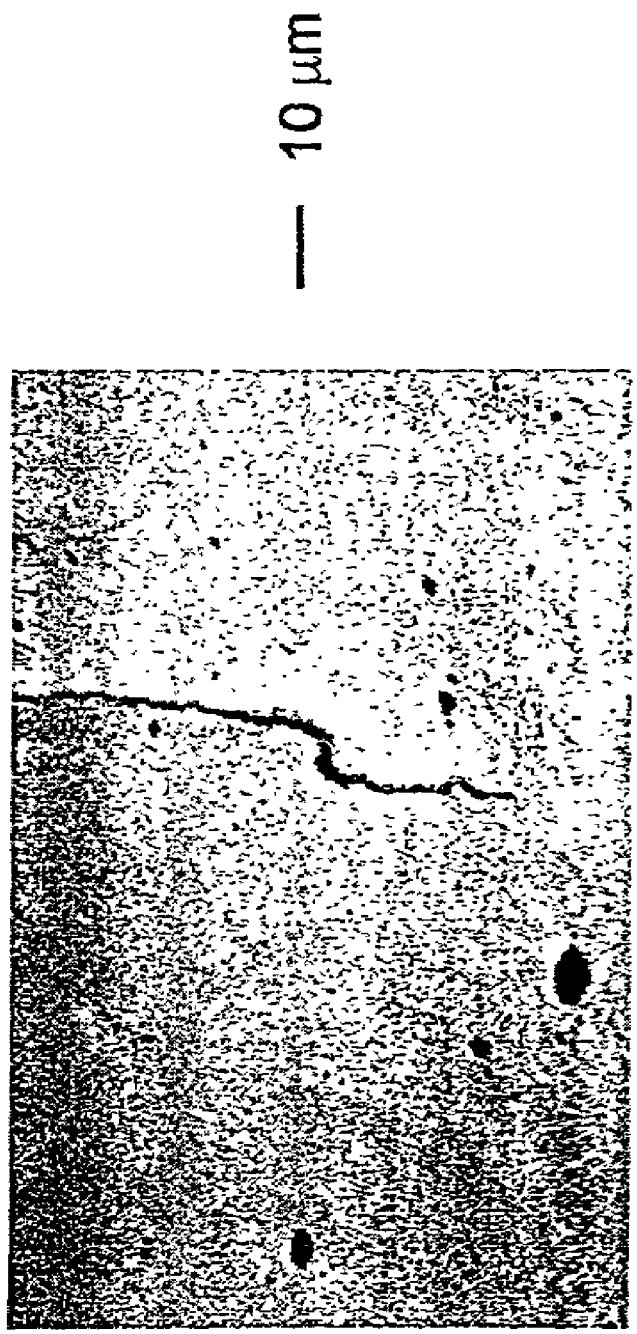
FIG. 14 is a SEM image using BEI (back-scattered electron imaging) of the topological morphology of the fracture surface of a film made from a 60/40 blend of grafted PBS/grafted PEO wherein no PEO phase is visible.

The observed improvement in blend compatibility by reactive blending was further supported by compositional mapping of the same fracture surfaces of the 60/40 PBS/PEO physical and reactive blend films by BEI (back-scattered electron imaging). The BEI images are shown in FIGS. 13 and 14. The phase with a higher average atomic number, the PBS phase, showed a brighter image on the photomicrograph. The PEO phase, with a lower average atomic number, appeared as the darker phase. In FIG. 13, the dispersed PEO phases were easily visible throughout the physical blend film, ranging from 1 to 3 microns in size. However, in FIG. 14, no PEO phase was visible in over 95% of the total area of the image for the reactive blend film (even though the PEO is 40% of the blend). Only a few dark particles, possibly due to PEO, were observed in the image.

Analysis of the thermal properties of PBS/PEO physical and reactive blends by differential scanning calorimetry (DSC) was carried out using the following procedure. DSC was performed on a TA Instruments DSC 2910. 10–15 mg of film sample was used for each test. The following method was followed for each test: (1) equilibrate at -20° C., (2)

isothermal for 1 minute, (3) ramp at 20° C./minute to 200° C., (4) ramp at 30° C./minute to 30° C. Table 10 shows the data from DSC analysis.

TABLE 10

DSC Analysis of PBS/PEO Physical and Reactive Blends

| Blend Composition | PEO | | PBS | |
|---|---|---|---|---|
| | $T_m$ (° C.) | ΔH (J/g) | $T_m$ (° C.) | ΔH (J/g) |
| 20/80 | 62.6 | 114.8 | 110.5 | 18.9 |
| 20/80 Reactive | 58.4 | 100.3 | 109.9 | 16.4 |
| 30/70 | 61.9 | 93.8 | 111.6 | 34.3 |
| 30/70 Reactive | 57.3 | 88.6 | 110.9 | 30.4 |
| 40/60 | 62.3 | 82.2 | 112.1 | 36.8 |
| 40/60 Reactive | 55.8 | 71.7 | 111.3 | 41.8 |
| 50/50 | 61.4 | 68.2 | 111.7 | 46.2 |
| 50/50 Reactive | 54.6 | 58.0 | 111.0 | 46.8 |
| 60/40 | 61.0 | 56.3 | 111.7 | 55.0 |
| 60/40 Reactive | 54.0 | 52.7 | 111.3 | 56.5 |

For the reactive blends, both the melting peaks ($T_m$) and the enthalpy of melting (ΔH) were observed to decrease compared to the physical blends at the same weight ratios. Additionally, the melting peaks for the PEO phase of PBS/PEO reactive blends were observed to decrease with increased PEO content in the blends. The observed changes in thermal properties were an indication of modified crystalline structure and an indirect indication of grafting.

Figure 15:
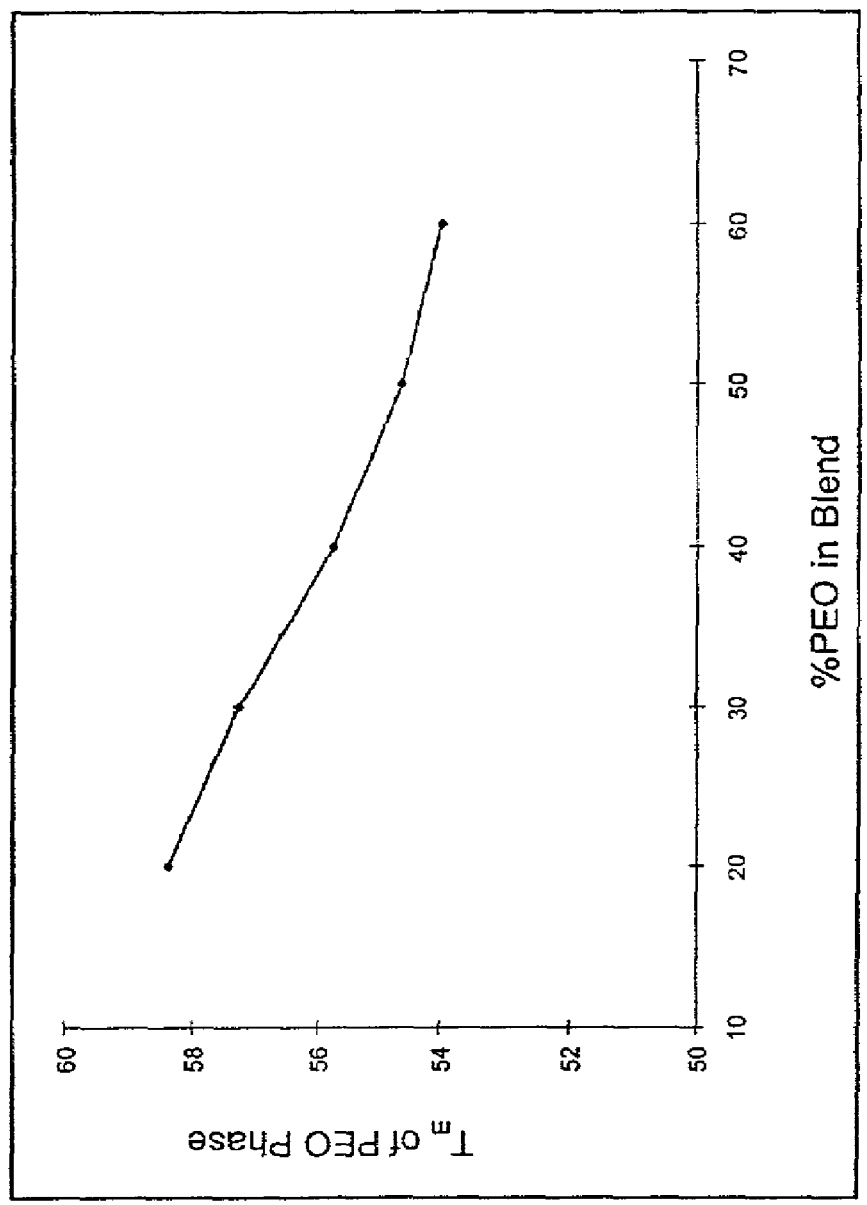
FIG. 15 is a graph of a DSC analysis of PBS/PEO blends showing the observed decrease in $T_m$ for the PEO phase of the PBS/PEO reactive blends as percent PEO in the blends was increased.
Figure 16:
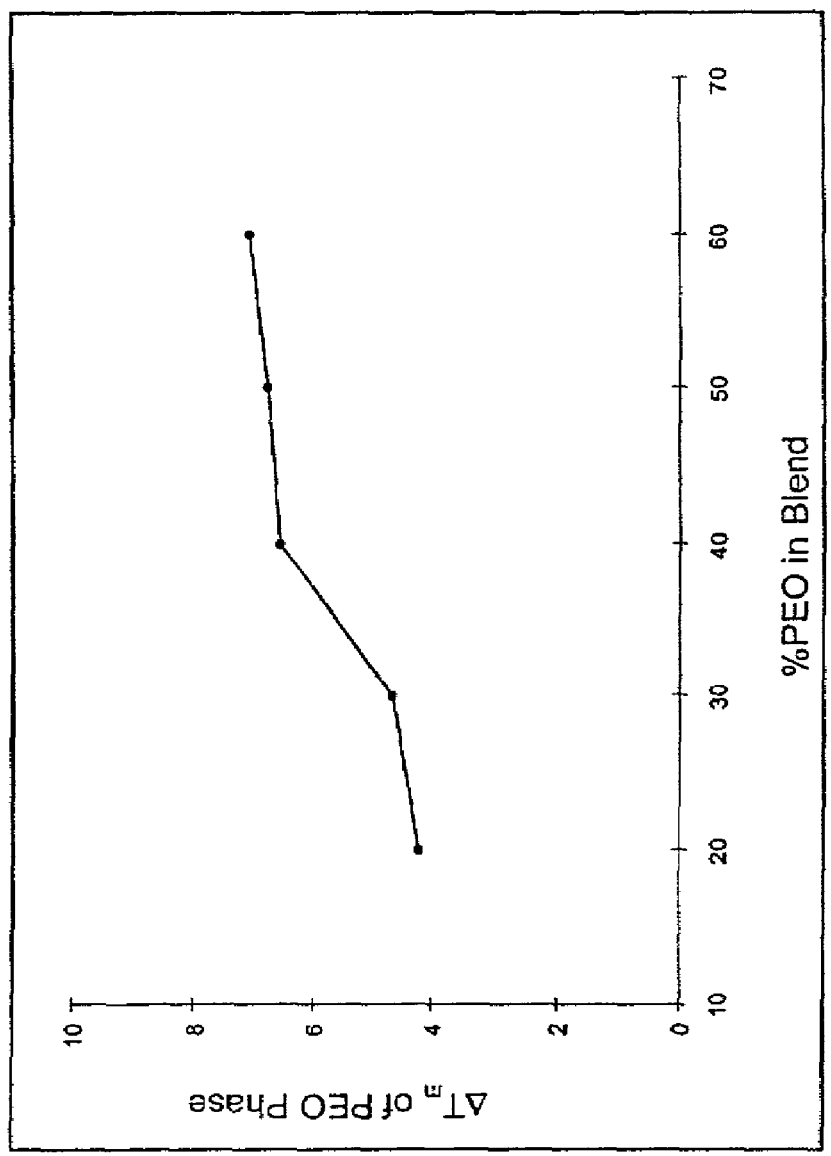
FIG. 16 is a graph of a DSC analysis of PBS/PEO blends showing an increase in change of $T_m$ ($\Delta T_m$) for the PEO phase of the reactive blends compared to physical blends as the percent PEO in the blends was increased.

FIG. 15 shows the observed decrease in $T_m$ for the PEO phase of the PBS/PEO reactive blends as percent PEO in the blends was increased. FIG. 16 shows an increase in change of $T_m$ (Δ$T_m$) for the PEO phase of the reactive blends compared to physical blends as the percent PEO in the blends was increased.

FIG. 17 displays a comparison between the DSC curves for 30/70 PBS/PEO physical and reactive blends. Both curves show two characteristic melting peaks, the first for PEO and the second for PBS. The curves display the decrease in $T_m$ and ΔH for the PEO and PBS components.

Melt rheology was studied for PBS/PEO physical and reactive blends on a Göettfert capillary rheometer at 195° C. using the following procedure. Melt rheology tests were performed on a Göettfert Rheograph 2003 with a 30/1 mm L/D die at 195° C. (the observed melt temperature for most film-converting runs). The apparent melt viscosity for each material was determined at apparent shear rates of 50, 100, 200, 500, 1000, 2000 s$^{-1}$. A rheology curve was plotted for each material of apparent viscosity versus apparent shear rate.

FIG. 18 displays the melt rheology curves 20/80 and 60/40 PBS/PEO physical and reactive blends, as well as the melt rheology curve for PBS alone. The results showed that the physical blends, over the entire range of shear rates, had higher melt viscosity than the reactive blends. Additionally, with greater amounts of PBS, the melt viscosity was reduced in both the physical and reactive blends. The observed decrease in melt viscosity of the reactive blends was expected to be due to lubrication effects of grafted and unreacted PEG-MA, as well as the reduction of molecular weight and improved compatibility due to reactive blending. The reduction in melt viscosity was an indirect indication of chemical modification of PBS and/or PEO due to reactive blending with PEG-MA. The reduction in melt viscosity with increasing PBS composition was expected because of the lower viscosity of PBS compared to PEO. Because of the low melt viscosity of the reactive blends, fiber-spinning may be a possibility for further applications of PBS/PEO reactive blends.

EXAMPLE 11

As shown in Example 1, the grafting of PHBV with HEMA by a continuous reactive extrusion process is not practical because the grafted PHBV does not solidify or crystallize at a sufficient rate. The following example shows how the grafted PHBV can be modified so that it can be produced by a continuous reactive extrusion process.

The same Haake counter-rotating, twin-screw extruder was used as in Example 1. The four temperature zones were set at 170°, 200°, 190° and 190° C., respectively. The screw speed was 150 rpm. A mixture of PLA and PHBV in a weight ratio of 1:1 were fed into the extruder with a volumetric feeder at a throughput of 5.0 lb/hr. The PHBV was the same as used in Example 1. The PLA was purchased from Aldrich Chemical Company of Milwaukee, Wis. (Aldrich Catalog No. 42,232-6). The PLA was a biodegradable polymer and had a number average molecular weight of approximately 60,000 g/mo. And a weight average molecular weight of approximately 144,000 g/mol. HEMA monomer and Lupersol® 101 were injected into the extruder at throughputs of 0.5 lb/hr and 0.025 lb/hr, respectively. The HEMA and Lupersole® 101 were the same as used in Example 1. The extruded strands solidified quickly and were easily directly pelletized.

EXAMPLE 12

The same procedure and extrusion conditions were used as in Example 11, except the feeding rate of the polymer mixture was increased to 8.7 lb/hr. Even at this high extrusion rate, the extruded strands quickly solidified and were easily directly pelletized.

EXAMPLE 13

The same procedure and extrusion conditions were used as in Example 12, except butyl acrylate was substituted for HEMA. The butyl acrylate was fed at a rate of 0.86 lb/hr and the Lupersol® 101 was fed at a rate of 0.044 lb/hr. The extruded strands quickly solidified and were easily directly pelletized.

EXAMPLE 14

The same procedure was followed as in Example 11, except the temperature zones were set at 170°, 180°, 180° and 190° C., respectively. Furthermore, PEO was substituted for the PLA. A mixture of PEO and PHBV in a weight ratio of 50:50 were fed into the extruder with a volumetric feeder at a throughput of 5.0 lb/hr. The PEO was the same as used in Example 10. HEMA monomer and Lupersol® 101 were injected into the extruder at throughputs of 0.5 lb/hr and 0.025 lb/hr, respectively. The extruded strands solidified quickly and were easily directly pelletized.

EXAMPLE 15

The same procedure was followed as in Example 14, except PEG-MA was substituted for HEMA. The extruded strands solidified quickly and were easily directly pelletized.

It is to be understood that these Examples are illustrative embodiments and that this invention is not to be limited by any of the Examples or details in the description. Rather, the claims appended hereto are to be construed broadly within the scope and spirit of the invention.

We claim:

1. A polymer composition comprising a blend of a polylactide grafted with a polar monomer, oligomer, or polymer or a combination thereof and a second biodegradable polymer grafted with a polar monomer, oligomer, or polymer or a combination thereof, wherein said second biodegradable polymer is other than polylactide.

2. The composition of claim 1, wherein said polylactide comprises about 1% to 99% by weight of said polymer blend and second biodegradable polymer comprises about 1% to 99% by weight of said polymer blend.

3. The composition of claim 1, wherein said second biodegradable polymer comprises a poly(hydroxy alkanoate).

4. The composition of claim 3, wherein said poly(hydroxy alkanoate) is poly($\beta$-hydroxybutyrate-co-$\beta$-hydroxyvalerate).

5. The polymer composition of claim 1, wherein said polar monomer is an ethylenically unsaturated monomer containing at least one polar functional group or said oligomer or said polymer is an oligomer or a polymer polymerized from an ethylenically unsaturated monomer containing at least one polar functional group.

6. The polymer composition of claim 5, wherein said at least one polar functional group is a hydroxyl, carboxyl, sulfonate, halide, glycidyl, cyano, carbonyl, thiol, sulfonic groups or a combination thereof.

7. The polymer composition of claim 5, wherein said at least one polar functional group is a hydroxyl group.

8. The polymer composition of claim 1, wherein said polar monomer is a polar vinyl monomer.

9. The polymer composition of claim 1, wherein said polar monomer is selected from poly(ethylene glycol) acrylate, poly(ethylene glycol) alkyl ether acrylate, poly(ethylene glycol) methacrylate, poly(ethylene glycol) alkyl ether methacrylate, acrylic acid, maleic anhydride, itaconic acid, sodium acrylate, 3-hydroxypropyl methacrylate, 2-hydroxyethyl methacrylate, 3-hydroxypropyl acrylate, 2-hydroxyethyl acrylate, acrylamide, 2-bromoethyl methacrylate, 2-chloroethyl methacrylate, 2-iodoethyl methacrylate, 2-bromo ethyl acrylate, 2-chloroethyl acrylate, 2-iodoethyl acrylate, glycidyl methacrylate, 2-acrylate, 2-cyanoethyl acrylate, glycidyl acrylate, 4-nitrophenyl acrylate, pentabromophenyl acrylate, poly(propylene glycol) methacrylate, poly(propylene glycol) acrylate, 2-propene-1-sulfonic acid and its sodium salt, 2-sulfoethyl acrylate, 2-sulfoethyl methacrylate, 3-sulfopropyl acrylate, 3-sulfopropyl methacrylate or mixtures thereof.

10. The polymer composition of claim 1, wherein said polar monomer, oligomer, or polymer is selected from 2-hydroxyethyl methacrylate or polyethylene glycol methacrylate.

11. The polymer composition of claim 1, wherein said polar monomer, oligomer, or polymer is selected from hydroxyalkyl acrylate or hydroxyalkyl methacrylate.

12. The polymer composition of claim 8, wherein said polar vinyl monomer is hydroxyalkyl acrylate or hydroxyalkyl methacrylate.

13. The polymer composition of claim 8, wherein said polar vinyl monomer is 2-hydroxyethyl methacrylate.

14. A polymer composition comprising a blend of a polylactide grafted with 2-hydroxyethyl methacrylate or poly (ethylene glycol) methacrylate and poly($\beta$-hydroxybutyrate-co-$\beta$-hydroxyvalerate) grafted with 2-hydroxyethyl methacrylate or poly (ethylene glycol) methacrylate.

15. A polymer composition comprising a blend of a poly(ethylene oxide) grafted with 2-hydroxyethyl methacrylate or poly (ethylene glycol) methacrylate and poly($\beta$-hydroxybutyrate-co-$\beta$-hydroxyvalerate) grafted with 2-hydroxyethyl methacrylate or poly (ethylene glycol) methacrylate.

16. A film comprising the composition of claim 1.

17. A fiber comprising the composition of claim 1.

18. An article comprising the composition of claim 1.

19. A polymer composition comprising a blend of two or more different biodegradable polymers grafted with polyethyleneglycol methacrylate or 2-hydroxyethyl methacrylate, wherein one of the biodegradable polymers is polylactide.

20. A film comprising the composition of claim 19.

21. A fiber comprising the composition of claim 19.

22. An article comprising the composition of claim 19.

23. The composition of claim 1, wherein said composition has improved processability.

24. The composition of claim 1, wherein said composition has improved mechanical properties.

25. The composition of claim 1, wherein said composition has improved cooling properties and an increased solidification rate.

* * * * *